United States Patent
Suwabe et al.

[11] Patent Number: 5,966,349
[45] Date of Patent: Oct. 12, 1999

[54] REWRITABLE HIGH DENSITY MAGNETO-OPTICAL DISK

[75] Inventors: Masatsugku Suwabe; Yoshihito Fukushima; Yoshihiro Muto, all of Miyagi, Japan

[73] Assignee: Sony Corporation, Tokyo, Japan

[21] Appl. No.: 08/961,134

[22] Filed: Oct. 30, 1997

[30] Foreign Application Priority Data

Oct. 31, 1996 [JP] Japan ................................ 8-290564

[51] Int. Cl.$^6$ ............................ G11B 11/00; G11B 11/10
[52] U.S. Cl. .................................. 369/13; 428/694 EC
[58] Field of Search ........................... 369/13, 288, 283, 369/286; 428/694 EC, 694 ML, 694 MM, 694 RE; 360/59, 114

[56] References Cited

U.S. PATENT DOCUMENTS

| | | | |
|---|---|---|---|
| 5,418,076 | 5/1995 | Shiratori ........................ | 428/694 EC |
| 5,449,566 | 9/1995 | Fujii et al. ..................... | 428/694 EC |
| 5,740,133 | 4/1998 | Tamanoi et al. ................. | 369/13 |

FOREIGN PATENT DOCUMENTS

| | | |
|---|---|---|
| 2 0 482 606 | 4/1992 | European Pat. Off. . |
| 2 0 498 440 | 8/1992 | European Pat. Off. . |
| 1 0 684 601 | 11/1995 | European Pat. Off. . |

*Primary Examiner*—Ali Neyzari
*Attorney, Agent, or Firm*—Hill & Simpson

[57] ABSTRACT

A magneto-optical recording medium capable of performing light-intensity-modulation direct overwrite and having excellent practical characteristics is provided. A magneto-optical recording film is formed by stacking a reproducing layer made of a magnetic material from which a large Kerr rotation angle can be obtained, a memory layer made of a magnetic material having great magnetic anisotropy, an intermediate layer having small magnetic anisotropy and made of TMrich rare earth-transition metal amorphous alloy, a recording layer having a Curie temperature higher than those of the memory layer and the intermediate layer and made of TMrich rare earth-transition metal amorphous alloy, a switching layer made of a magnetic material having a Curie temperature lower than that of the recording layer and an initializing layer made of a magnetic material having a Curie temperature higher than those of the reproducing layer, the memory layer, the intermediate layer, the recording layer and the switching layer.

32 Claims, 10 Drawing Sheets

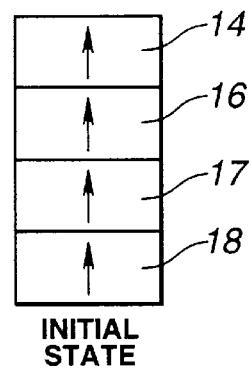
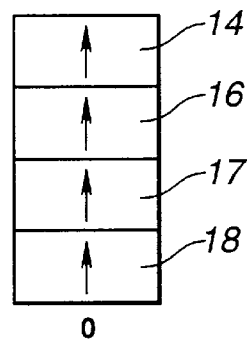
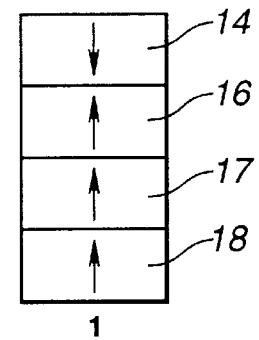
FIG.2A    FIG.2B    FIG.2C
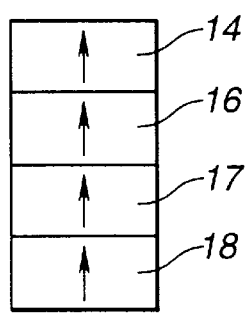
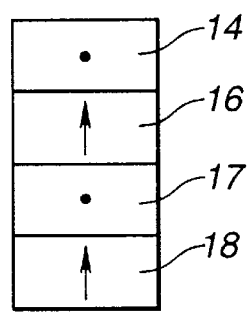
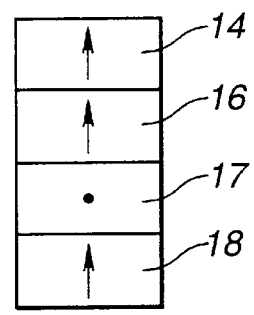
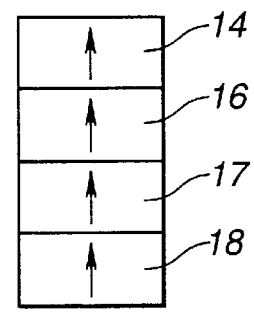
FIG.3A    FIG.3B    FIG.3C    FIG.3D

REWRITABLE HIGH DENSITY MAGNETO-OPTICAL DISK

BACKGROUND OF THE INVENTION

1. Field of the Invention

The present invention relates to a magneto-optical disk having a multilayered magnetic film formed by stacking a plurality of magnetic layers and capable of performing a light-intensity-modulation direct overwriting operation.

2. Description of the Related Art

In recent years, a requirement for raising the transfer rate has arisen in the field of the magneto-optical recording and reproducing technical field. To meet the foregoing requirement, a variety of techniques have been put into practical use. Among the practical techniques, light-intensity-modulation direct overwrite has been known as a representative technique.

When a signal is recorded on a magneto-optical recording medium by the light intensity modulation method, a weak DC magnetic field is generally applied to the magneto-optical recording medium to modulate a laser beam depending upon whether or not a signal exists so as to apply the modulated laser beam to the magneto-optical recording medium. Therefore, the magneto-optical recording and reproducing apparatus adapted to the light intensity modulation method must renew recording after a recorded portion has been erased when a signal is recorded on a portion on which a previous signal has been recorded. Therefore a signal cannot directly be written over a recorded portion, that is, so-called direct overwrite cannot be performed.

Therefore, a major portion of magneto-optical recording and reproducing apparatuses put into practical use must initially perform an erasing operation prior to performing an operation for recording a new signal. Thus, there arises a problem in that at least time required for the magneto-optical recording medium to rotate at least two times is required. It leads to a fact that the transfer rate cannot be raised.

The light-intensity-modulation direct overwrite has been contrived to overcome the above-mentioned problem, the light-intensity-modulation direct overwrite being a technique adapted to the light intensity modulation method and enabling direct overwrite to be performed.

A specific method of the light-intensity-modulation direct overwrite has been disclosed in Japanese Patent Laid-Open No. 62-175948. The foregoing method is arranged such that a magneto-optical recording medium is formed by stacking two magnetic layers having different magnetic characteristics in such a manner that the switched connection is established between the two layers. A recording and reproducing apparatus according to the foregoing method includes an optical system which is capable of applying a laser beam controlled to a binary value consisting of a high level and a low level when a recording operation is performed; a recording magnetic field generating unit of a type for use in a usual magneto-optical recording and reproducing apparatus; and an external magnetic field generating unit which is capable of inverting only one of two magnetic layers at room temperature, that is, a so-called initializing magnet.

However, the above-mentioned method attempted to realize light-intensity-modulation direct overwrite must be provided with the initializing magnet for generating an initializing magnetic field of several kOe. The foregoing structure raises a problem when the magneto-optical recording and reproducing apparatus is designed.

Accordingly, reduction in the initializing magnetic field has been attempted by a method disclosed in, for example, Japanese Patent Laid-Open No. 1-185853. As a result, the initializing magnetic field has been reduced to about 2 kOe, which is considerably larger than the recording magnetic field which is about 300 Oe. The large initializing magnetic field prevents practical use of the above-mentioned method.

On the other hand, another method has been investigated individually from the foregoing attempt to reduce the initializing magnetic field in order to essentially overcome the above-mentioned problem. The method is attempted to enable light-intensity-modulation direct overwrite to be performed without use of the initializing magnetic field. As a result, magneto-optical recording mediums, disclosed in Japanese Patent Laid-Open No. 63-268103 and Japanese Patent Laid-Open No. 3-219449, have been contrived.

The magneto-optical recording mediums have the basic structure formed by adding a magnetic layer serving as the initializing magnet attributable to switched connection to the magneto-optical recording medium disclosed in Japanese Patent Laid-Open No. 62-175948. When a magneto-optical recording medium of the foregoing type is used, the light-intensity-modulation direct overwrite can be performed without use of the initializing magnet.

However, the magneto-optical recording medium enabled to perform the light-intensity-modulation direct overwrite by adding the magnetic layer serving as the initializing magnet attributable to the switched connection cannot simultaneously satisfy the required characteristics, including the sensitivity to the recording magnetic field, the quality of the signal and stability of the overwriting operation. The known magneto-optical recording mediums capable of performing light-intensity-modulation direct overwrite cannot simultaneously satisfy the above-mentioned characteristics and practical use has not been realized.

SUMMARY OF THE INVENTION

In view of the foregoing, an object of the present invention is to provide a magneto-optical recording medium which is capable of performing light-intensity-modulation direct overwrite and which has excellent practical characteristics.

In order to achieve the above-mentioned object, according to one aspect of the present invention, there is provided a magneto-optical recording medium capable of performing light-intensity-modulation direct overwrite and comprising a first magnetic layer; a second magnetic layer formed on the first magnetic layer; a third magnetic layer formed on the second magnetic layer; a fourth magnetic layer formed on the third magnetic layer; a fifth magnetic layer formed on the fourth magnetic layer; and a sixth magnetic layer formed on the fifth magnetic layer The magneto-optical recording medium has a structure that the first magnetic layer is made of a magnetic material with which a Kerr rotation angle greater than a Kerr rotation angle obtainable from the second magnetic layer can be obtained, the second magnetic layer is made of a magnetic material having magnetic anisotropy greater than that of the first magnetic layer, the third magnetic layer is made of rare earth-transition metal amorphous alloy which has magnetic anisotropy smaller than that of the second magnetic layer and that of the fourth magnetic layer and in which sublattice magnetization of the transition metal element is larger than that of the rare earth element, the fourth magnetic layer is made of rare earth-transition metal amorphous alloy which has a Curie temperature higher than that of the second magnetic layer and that of the third magnetic layer and in which sublattice magnetization of the transition metal element is larger than that of the rare earth element, the fifth magnetic layer is made of a magnetic material having a Curie temperature lower than that of the fourth magnetic layer, and the sixth magnetic layer is made of a magnetic material having a Curie temperature higher than those of the first to fifth magnetic layers.

The first magnetic layer of the magneto-optical recording medium having the six-layered structure is usually called a reproducing layer, the second magnetic layer is called a memory layer, the third magnetic layer is called an intermediate layer, the fourth magnetic layer is called a recording layer, the fifth magnetic layer is called a switching layer and the sixth magnetic layer is called an initializing layer.

The first and second magnetic layers are layers on which recording signals are recorded and arranged to be magnetized into a predetermined direction in response to the recording signal so as to form a recording magnetic domain. The signal recorded on the magneto-optical recording medium is reproduced by detecting the direction of magnetization of the recording magnetic domains formed in the first and second magnetic layers.

The third magnetic layer is a layer for adjusting a state of magnetic connection between the second magnetic layer and the fourth magnetic layer attributable to exchange interaction. The third magnetic layer mainly serves to cause the recording magnetic domains formed in the first and second magnetic layers to be stabilized at a temperature near a room temperature. That is, the third magnetic layer stabilizes the recording magnetic domains formed in the first and second magnetic layers.

The fourth magnetic layer is a layer for temporarily storing a signal, which must be recorded when a recording operation is performed. When the recording operation is performed, the direction of the magnetization is temporarily changed in response to the recording signal. That is, when a signal is recorded on the magneto-optical recording medium, the fourth magnetic layer is first magnetized in response to the recording signal, and then the magnetization of the fourth magnetic layer is transferred to the first magnetic layer and the second magnetic layer.

The fifth magnetic layer is a layer for controlling a state of the magnetic connection between the fourth magnetic layer and the sixth magnetic layer, the fifth magnetic layer being temporarily demagnetized when the recording operation is performed. That is, the fifth magnetic layer is brought to a demagnetized state to prevent magnetic connection between the fourth magnetic layer and the sixth magnetic layer attributable to the exchange interaction until the magnetization of the fourth magnetic layer is transferred to the first and second magnetic layers when the recording operation is performed. After the magnetization of the fourth magnetic layer has been transferred to the first and second magnetic layers, the fifth magnetic layer is again magnetized to cause the fourth magnetic layer and the sixth magnetic layer to be magnetically connected to each other attributable to the exchange interaction.

The sixth magnetic layer is a layer serving as an initializing magnet and arranged to be always magnetized into a predetermined direction including a state in which the recording operation is performed. The sixth magnetic layer causes magnetization of the fourth magnetic layer and that of the fifth magnetic layer to be returned to the initial state after the magnetization of the fourth magnetic layer has been transferred to the first magnetic layer and the second magnetic layer when the recording operation is performed.

The magneto-optical recording medium according to the present invention has the structure such that the third magnetic layer and the fourth magnetic layer are made of rare earth-transition metal amorphous alloy in which the sublattice magnetization of the transition metal element is larger than that of the rare earth element. Therefore, excellent characteristics can be obtained which are the sensitivity to recording magnetic field, the quality of the signal and stability of the overwrite operation.

It is preferable that the first magnetic layer is made of rare earth-transition metal amorphous alloy in which the transition metal element and the rare earth element are formed in such a manner that the ratio TM/RE of the quantity of the transition metal element formed into a film and the quantity of the rare earth element formed into a film is in a range from 1.25 to 1.7. Specifically, it is preferable that the first magnetic layer is made of GdFeCo, the ratio of Co in the transition metal element contained in the first magnetic layer is 10 atom % to 25 atom % and the thickness of the first magnetic layer is 10 nm or greater.

It is preferable that the magneto-optical recording medium has the structure that the second magnetic layer is made of rare earth-transition metal amorphous alloy in which the sublattice magnetization of the rare earth element is larger than that of the transition metal element and that the second magnetic layer is made of rare earth-transition metal amorphous alloy in which the transition metal element and the rare earth element are formed in such a manner that the ratio TM/RE of the quantity of the transition metal element formed into a film and the quantity of the rare earth element formed into a film is in a range from 1.0 to 1.4. Specifically, it is preferable that the second magnetic layer is made of TbFeCo and that the ratio of Co in the transition metal element contained in the second magnetic layer is 4 atom % to 9 atom %. Moreover, it is preferable that the thickness of the second magnetic layer is 10 nm or greater.

It is preferable that the magneto-optical recording medium has a structure that the third magnetic layer is made of rare earth-transition metal amorphous alloy in which the transition metal element and the rare earth element are formed in such a manner that the ratio TM/RE of the quantity of the transition metal element formed into a film and the quantity of the rare earth element formed into a film is in a range from 1.4 to 2.0. Specifically, it is preferable that the third magnetic layer is made of GeFe or GdFeC and that the ratio of Co in the transition metal element contained in the third magnetic layer is 5 atom % or lower. Moreover, it is preferable that the thickness of the third magnetic layer is 10 nm or greater.

It is preferable that the magneto-optical recording medium has a structure that the fourth magnetic layer is made of rare earth-transition metal amorphous alloy in which the transition metal element and the rare earth element are formed in such a manner that the ratio TM/RE of the quantity of the transition metal element formed into a film and the quantity of the rare earth element formed into a film is in a range from 1.2 to 1.4. Specifically, it is preferable that the fourth magnetic layer is made of Gd, Tb, Fe and Co and that the ratio of Co in the transition metal element contained in the fourth magnetic layer is 10 atom % to 18 atom %. Moreover, it is preferable that the thickness of the fourth magnetic layer is 10 nm to 30 nm.

It is preferable that the magneto-optical recording medium has a structure that the fifth magnetic layer is made of rare earth-transition metal amorphous alloy in which the transition metal element and the rare earth element are formed in such a manner that the ratio TM/RE of the quantity of the transition metal element formed into a film and the quantity of the rare earth element formed into a film is in a range from 1.4 to 2.0. Specifically, it is preferable that the fifth magnetic layer is made of TbFe or TbFeCo and that the ratio of Co in the transition metal element contained in the fifth magnetic layer is 10 atom % or lower. Moreover, it is preferable that the thickness of the fifth magnetic layer is 10 nm to 20 nm.

It is preferable that the magneto-optical recording medium has a structure that the sixth magnetic layer is made of rare earth-transition metal amorphous alloy in which the transition metal element and the rare earth element are formed in such a manner that the ratio TM/RE of the quantity of the transition metal element formed into a film and the quantity of the rare earth element formed into a film is in a range from 1.2 to 1.5. Specifically, it is preferable that the sixth magnetic layer is made of TbFeCo and that the ratio of Co in the transition metal element contained in the sixth magnetic layer is 70 atom % to 90 atom %. Moreover, it is preferable that the thickness of the sixth magnetic layer is 30 nm to 50 nm.

It is preferable that the magneto-optical recording medium further comprises a first dielectric layer formed below the first magnetic layer; and a second dielectric layer formed on the sixth magnetic layer. The first and second dielectric layers are formed by sputtering. When the first and second dielectric layers are formed by sputtering, the first dielectric layer is formed at a pressure of sputtering gas higher than that for use when the second dielectric layer is formed. It is preferable that the thickness of the first dielectric layer is 55 nm to 75 nm.

It is preferable that a heat conducting layer having a heat conductivity higher than that of the second dielectric layer is formed on the second dielectric layer. It is preferable that the heat conducting layer is made of AlTi and that the ratio of Ti in the heat conducting layer is 0.1 wt % to 10 wt %. Moreover, it is preferable that the thickness of the heat conducting layer is 10 nm to 60 nm.

Other objects, features and advantages of the invention will be evident from the following detailed description of the preferred embodiments described in conjunction with the attached drawings.

BRIEF DESCRIPTION OF THE DRAWINGS

FIG. 2 is a schematic view showing the directions of magnetization of a memory layer, a switching layer and an initializing layer in an initial state, a state in which "0" has been recorded and a state in which "1" has been recorded:

FIG. 3 is a schematic view showing transition of magnetization when "0" is written over recorded "0";

DETAILED DESCRIPTION OF THE PREFERRED EMBODIMENTS

Embodiments of the present invention will now be described with reference to the drawings. It is understood that the present disclosure of the preferred form can be changed in the details of construction and in the combination and arrangement of parts without departing from the spirit and the scope of the invention.

Structure of Magneto-Optical Disk

A magneto-optical recording medium according to the present invention is formed into a structure having no initializing magnet and capable of performing light-intensity-modulation direct overwrite.

Figure 1:
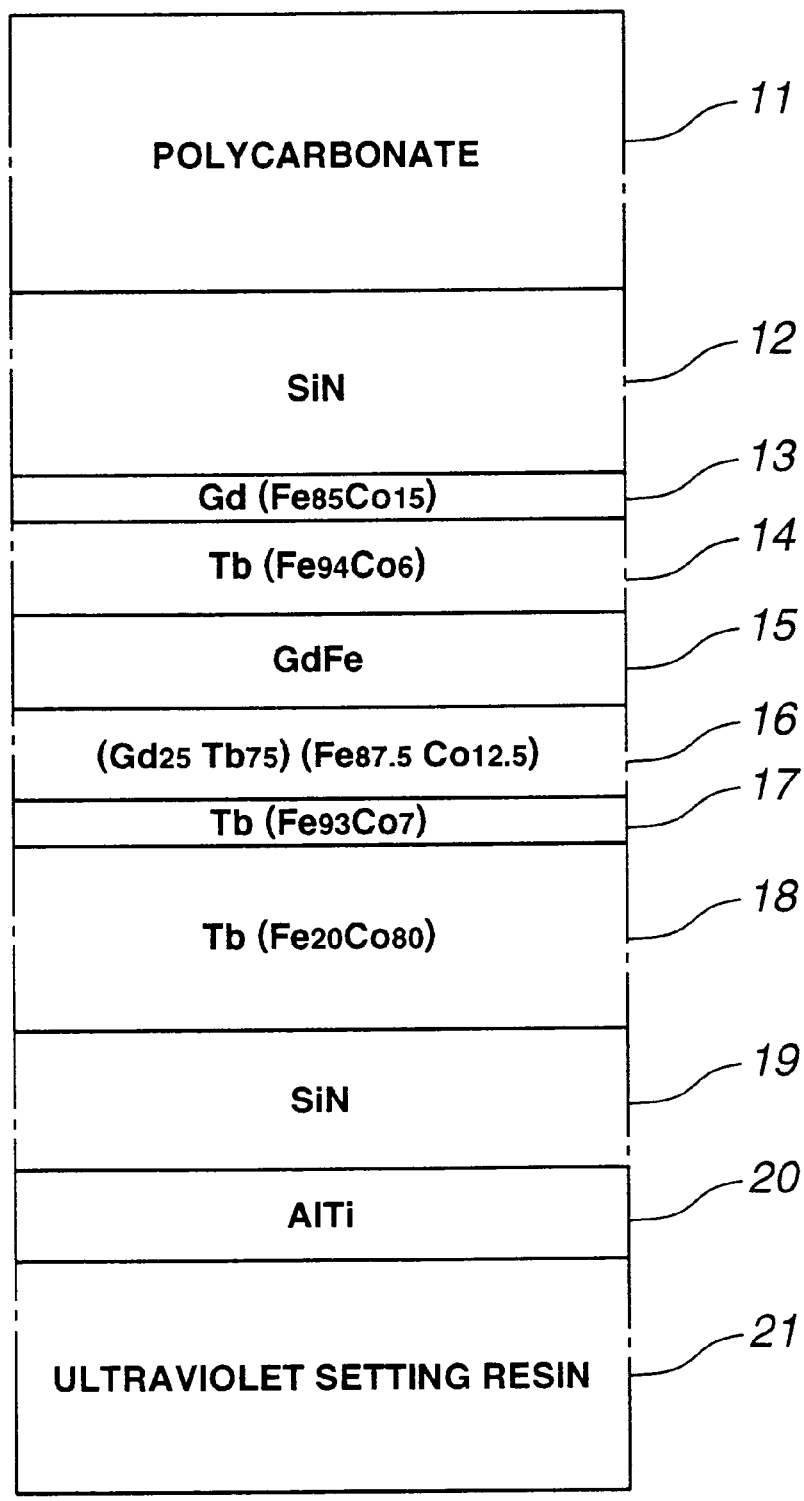
FIG. 1 is a diagram showing a stacked structure of an example of a magneto-optical disk according to the present invention.

The magneto-optical disk according to the present invention, as shown in FIG. 1, has a disk substrate 11 made of polycarbonate and formed into a disc shape, on which there are formed in the following order as, a first dielectric layer 12, a reproducing layer 13 serving as a first magnetic layer, a memory layer 14 serving as a second magnetic layer, an intermediate layer 15 serving as a third magnetic layer, a recording layer 16 serving as a fourth magnetic layer, a switching layer 17 serving as a fifth magnetic layer, an initializing layer 18 serving as a sixth magnetic layer, a second dielectric layer 19 and a heat conducting layer 20. Moreover, a protective layer 21 made of ultraviolet setting resin is formed on the above-mentioned stacked films.

The first dielectric layer 12 is made of SiN and arranged to have a thickness of 65 nm. The reproducing layer 13 is made of Gd ($Fe_{85}Co_{15}$) and arranged to have a thickness of 10 nm. The memory layer 14 is made of Tb ($Fe_{94}Co_6$) and arranged to have a thickness of 20 nm. The intermediate layer 15 is made of GdFe and arranged to have a thickness of 10 nm. The recording layer 16 is made of ($Gd_{25}Tb_{75}$)($Fe_{87.5}Co_{12.5}$) and arranged to have a thickness of 15 nm. The switching layer 17 is made of Tb ($Fe_{93}Co_7$) and arranged to have a thickness of 10 nm. The initializing layer 18 is made of Tb ($Fe_{20}Co_{80}$) and arranged to have a thickness of 40 nm. The second dielectric layer 19 is made of SiN and arranged to have a thickness of 30 nm. The heat conducting layer 20 is made of AlTi and arranged to have a thickness of 40 nm.

The reproducing layer 13 has a saturation magnetization Ms of about 140 emu/cc and a Curie temperature Tc of about 300° C. The memory layer 14 has a saturation magnetization Ms of about 150 emu/cc and a Curie temperature Tc of about 180° C. The intermediate layer 15 has a saturation magnetization Ms of about 250 emu/cc and a Curie temperature Tc of about 230° C. The recording layer 16 has a saturation magnetization Ms of about 0 emu/cc and a Curie temperature Tc of about 270° C. The switching layer 17 has a saturation magnetization Ms of about 170 emu/cc and a Curie temperature Tc of about 190° C. The initializing layer 18 has a saturation magnetization Ms of about 0 emu/cc and a Curie temperature Tc of about 300° C. or higher.

The reproducing layer 13, the memory layer 14, the intermediate layer 15 the recording layer 16, the switching layer 17 and the initializing layer 18 are continuously formed by, for example, DC magnetron sputter using, for example, Ar sputtering gas while maintaining a vacuum state. The composition of each magnetic layer is adjusted in such a way that, for example, four targets of Tb, Gd, Fe and $Fe_{20}Co_{80}$ are placed in one film forming chamber and power to be supplied to the targets is controlled. When each magnetic layer is formed, irregular thickness distribution and composition must be prevented. Therefore, it is preferable that the disk substrate 11 is held by a substrate holder attached to a circular metal plate called a "pallet", after which the pallet is revolved around the center of the pallet and the disk substrate 11 is rotated around the center of the substrate holder.

In this embodiment, the ratio of the amount of the transition metal element formed into a film and the rare earth element formed into a film is expressed as TM/RE. When the four targets Tb, Gd, Fe and $Fe_{20}Co_{80}$ are employed as described above, the ratio of the amount of formed films attributable to the Fe target and the $Fe_{20}Co_{80}$ target and the amount of the formed films attributable to the Tb target and the Gd target is TM/RE.

In the following description, a state where the sublattice magnetization of the transition metal element is larger than that of the rare earth element is called "TMrich" and a state where the sublattice magnetization of the transition metal element is smaller than that of the rare earth element is called "RErich".

The composition in which the sublattice magnetization of the rare earth element and that of the transition metal element are the same is generally called a compensation composition. When TM/RE=1.25, GeFe has the compensation composition. When TM/RE=1.25, GdFeCo has the compensation composition. When TM/RE=1.2, GdTbFeCo has the compensation composition. When TM/RE=1.4, TbFeCo has the compensation composition.

The magneto-optical disk was manufactured in such a way that the reproducing layer 13 was formed in such a manner that TM/RE was 1.5, the memory layer 14 was formed in such a manner that TM/RE was 1.1, the intermediate layer 15 was formed in such a manner that TM/RE was 1.8, the recording layer 16 was formed in such a manner that TM/RE was 1.3, the switching layer 17 was formed in such a manner that TM/RE was 1.8 and the initializing layer 18 was formed in such a manner that TM/RE was 1.4. At this time, the reproducing layer 13, the intermediate layer 15, the recording layer 16, the switching layer 17 and the initializing layer 18 are brought to the TMrich state and the memory layer 14 is brought to the RErich state.

The composition, thickness, TM/RE, saturation magnetization and Curie temperature of the above-mentioned layers forming the foregoing magneto-optical disk are collectively shown in Table 1.

TABLE 1

|  | Composition | Thickness [nm] |
|---|---|---|
| First Dielectric Layer | SiN | 65 |
| Reproducing Layer | $Gd(Fe_{85}Co_{15})$ | 10 |
| Memory layer | $Tb(Fe_{94}Co_6)$ | 20 |
| Intermediate layer | GdFe | 10 |
| Recording layer | $(Gd_{25}Tb_{75})(Fe_{87.5}Co_{12.5})$ | 15 |
| Switching layer | $Tb(Fe_{93}Co_7)$ | 10 |
| Initializing layer | $Tb(Fe_{20}Co_{80})$ | 40 |
| Second Dielectric Layer | SiN | 30 |
| Heat Conducting layer | AlTi | 40 |

|  | TM/RE | Saturated magnetization [emu/cc] | Curie temperature [° C.] |
|---|---|---|---|
| First Dielectric Layer | — | — | — |
| Reproducing Layer | 1.5 | 140 | 300 |
| Memory layer | 1.1 | 150 | 180 |
| Intermediate layer | 1.8 | 250 | 230 |
| Recording layer | 1.3 | 0 | 270 |
| Switching layer | 1.8 | 170 | 190 |
| Initializing layer | 1.4 | 0 | >300 |
| Second Dielectric Layer | — | — | — |
| Heat Conducting Layer | — | — | — |

Principle of Operation of Magneto-Optical Disk

The principle of the operation of each of the magnetic layers forming the above-mentioned magneto-optical disk which is performed when recording or reproducing is performed will now be described.

Description will be performed in such a manner that attention is paid to the memory layer 14, the recording layer 16, the switching layer 17 and the initializing layer 18, which are essential layers for the operation of the magneto-optical disk. Description of the reproducing layer 13 and the intermediate layer 15 are omitted here. FIGS. 2 to 6 for use in the following description show only the memory layer 14, the recording layer 16, the switching layer 17 and the initializing layer 18, which are essential layers for the operation of the magneto-optical disk. The directions of magnetization of the foregoing layers are indicated with arrows.

In an initial state, the magneto-optical disk is in a state as shown in FIG. 2A such that the direction of magnetization of the memory layer 14, the recording layer 16, the switching layer 17 and the initializing layer 18 are the same. When signal "0" among binary-coded information signals is recorded, the direction of magnetization of each of the magnetic layers is similar to that in the initial state. When signal "1" is recorded, the direction of magnetization of the memory layer 14 is inverted. That is, when "0" is recorded, the direction of magnetization of the memory layer 14, the recording layer 16, the switching layer 17 and the initializing layer 18 are the same, as shown in FIG. 2B. When "1" is recorded, the direction of magnetization of the memory layer 14 is inverted, as shown in FIG. 2C. As a matter of course, inversion between the state realized when "0" is recorded and the state realized when "1" is recorded may be permitted depending upon the recording format.

When an information signal is recorded on the foregoing magneto-optical disk, the recording operation is performed by the light intensity modulation method. That is, a low-level laser beam having a weak light intensity is applied in a state where a predetermined DC magnetic field is applied to the magneto-optical disk when "0" is recorded in accordance with the binary-coded information signal. A high-level laser beam having a strong light intensity is applied to the magneto-optical disk when "1" is recorded. Although the temperature of a portion irradiated with the laser beam is raised, the temperature realized when the low-level laser beam is applied is lower than the temperature realized when the high-level laser beam is applied.

Description about the operation which is performed when a low-level laser beam or a High-level laser beam is applied to record an information signal will now be described. The operation which is performed when "0" is written over recorded "0" will be described with reference to FIG. 3. The operation which is performed when "0" is written over recorded "1" will be described with reference to FIG. 4. The operation which is performed when "1" is written over recorded "0" will be described with reference to FIG. 5. The operation which is performed when "1" is written over recorded "1" will be described with reference to FIG. 6.

If a low-level laser beam is applied in a state where the direction of magnetization of the memory layer 14 is in a state in which "0" has been recorded as shown in FIG. 3A, magnetization of the memory layer 14 and the switching layer 17 is extinguished as shown in FIG. 3B when the temperature has been raised. At this time, the magnetization of the recording layer 16 and initializing layer 18 is retained without any change. That is, the intensity of the low-level laser beam is determined to a level with which the temperatures of the memory layer 14 and the switching layer 17 are raised to a degree with which magnetization of the memory layer 14 and the switching layer 17 is extinguished.

When the temperature is lowered after that, the memory layer 14 is again magnetized. At this time, the direction of magnetization of the memory layer 14 is, as shown in FIG. 3C, made to be the same as the direction of magnetization of the recording layer 16 because the magnetization of the recording layer 16 is transferred attributable to the switched connection with the recording layer 16. Note that the operation of the transference of the magnetization of the recording layer 16 to the memory layer 14 is hereinafter called a transferring operation and the temperature at which the transferring operation is performed is called transferring temperature.

When the temperature is further lowered after that, the switching layer 17 is again magnetized. At this time, the direction of magnetization of the switching layer 17 is made to be the same as the direction of magnetization of the initializing layer 18 because of the switched connection with the initializing layer 18. As a result of the above-mentioned transition, the state of magnetization of each layer is, as shown in FIG. 3D, brought to a state in which "0" has been recorded.

Figures 4A, 4B, 4C, 4D:
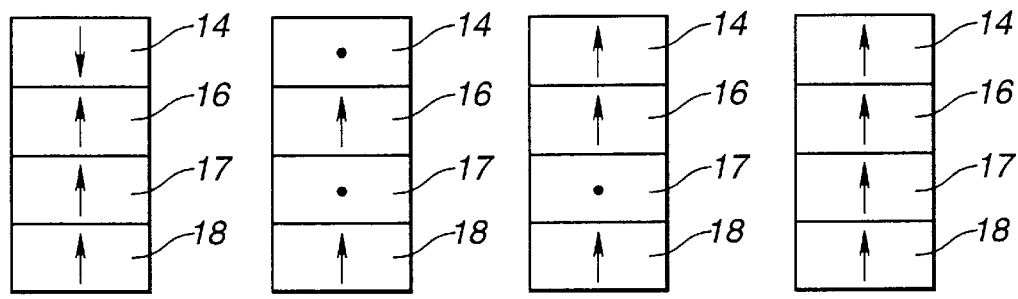
FIG. 4 is a schematic view showing transition of magnetization when "0" is written over recorded "1"

When a low-level laser beam is applied in a state where the direction of magnetization of the memory layer 14 is in a state where "1" has been recorded as shown in FIG. 4A, the magnetization of the memory layer 14 and the switching layer 17 are extinguished as shown in FIG. 4B when the temperature is raised, similarly to the state shown in FIG. 3B. At this time, the magnetization of the recording layer 16 and the initializing layer 18 is not changed and the magnetization is retained.

When the temperature is lowered to the transferring temperature after that, the memory layer 14 is again magnetized. At this time, the direction of magnetization of the memory layer 14 is made to be the same as the direction of magnetization of the recording layer 16 because of the switched connection with the recording layer 16, as shown in FIG. 4C.

When the temperature is further lowered after that, the switching layer 17 is again magnetized. At this time, the direction of magnetization of the switching layer 17 is made to be the same as the direction of magnetization of the initializing layer 18 because of the switched connection with the initializing layer 18. As a result of the above-mentioned transition, the state of magnetization of each layer is brought to a state where "0" has been recorded, as shown in FIG. 4D.

Figures 5A, 5B, 5C, 5D:
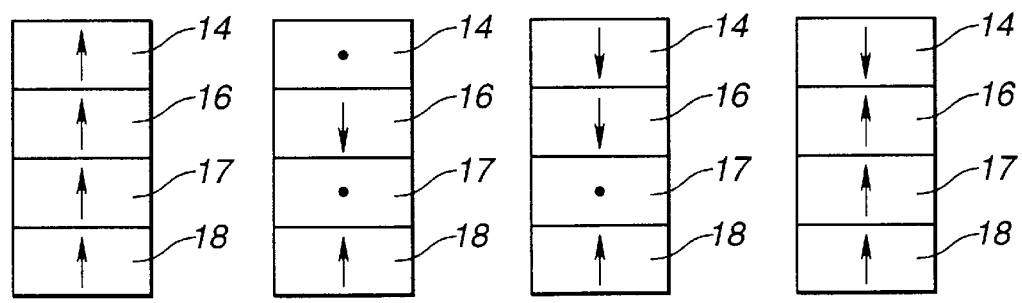
FIG. 5 is a schematic view showing transition of magnetization when "1" is written over recorded "0"

When a high-level laser beam is applied in a state where the direction of magnetization of the memory layer 14 has been brought to a state where "0" has been recorded as shown in FIG. 5A, the magnetization of the memory layer 14 and the switching layer 17 is extinguished as shown in FIG. 5B. Moreover, the direction of magnetization of the recording layer 16 is inverted by a DC magnetic field which is being applied from outside. That is, the intensity of the high-level laser beam is determined to a level with which the temperatures of the memory layer 14 and the switching layer 17 are raised to a degree with which magnetization of the memory layer 14 and the switching layer is extinguished and the coercive force of the recording layer 16 can be reduced sufficiently.

When the temperature is lowered to the transferring temperature after that, the memory layer 14 is again magnetized. At this time, the direction of magnetization of the memory layer 14 is, as shown in FIG. 5C, made to be the same as the direction of magnetization of the recording layer 16 because the magnetization of the recording layer 16 is transferred attributable to the switched connection with the recording layer 16.

When the temperature is further lowered after that, the switching layer 17 is again magnetized. At this time, the direction of magnetization of the switching layer 17 is made to be the same as the direction of magnetization of the initializing layer 18 because of the switched connection with the initializing layer 18. Moreover, the direction of magnetization of the recording layer 16 is made to be the same as the direction of magnetization of the switching layer 17 because of the switched connection with the switching layer 17. As a result of the foregoing transition, the state of each layer is brought to a state where the magnetization of the memory layer 14 has been inverted as shown in FIG. 5D and to a state where "1" has been recorded.

Figures 6A, 6B, 6C, 6D:
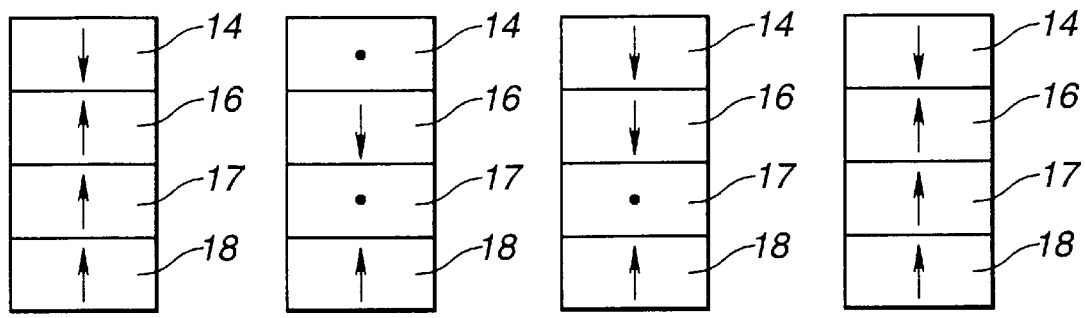
FIG. 6 is a schematic view showing transition of magnetization when "1" is written over recorded "1"

When a high-level laser beam is applied in a state where the direction of magnetization of the memory layer 14 has been brought to a state where "1" has been recorded as shown in FIG. 6A, the magnetization of the memory layer 14 and the switching layer 17 is extinguished, as shown in FIG. 6B. Moreover, the direction of magnetization of the recording layer 16 is inverted by the DC magnetic field which is being applied from outside.

When the temperature is lowered to the transferring temperature after that, the memory layer 14 is again magnetized. At this time, the direction of magnetization of the memory layer 14 is, as shown in FIG. 6C, made to be the same as the direction of magnetization of the recording layer 16 because the magnetization of the recording layer 16 is transferred attributable to the switched connection with the recording layer 16.

When the temperature is further lowered after that, the switching layer 17 is again magnetized. At this time, the direction of magnetization of the switching layer 17 is made to be the same as the direction of magnetization of the initializing layer 18 attributable to the switched connection of the initializing layer 18. Moreover, the direction of magnetization of the recording layer 16 is made to be the same as the direction of magnetization of the switching layer 17 attributable to the switched connection with the switching layer 17. As a result of the above-mentioned transition, the state of magnetization of each layer is, as shown in FIG. 6D, brought to a state in which the magnetization of only the memory layer 14 is inverted, that is, to a state where "1" has been recorded.

As described above, the above-mentioned magneto-optical disk is able to change the direction of magnetization of the memory layer 14 by only modulating the intensity of the laser beam, which is applied, so that direct overwrite is performed.

Although the above-mentioned magneto-optical disk has the reproducing layer 13 formed adjacent to the memory layer 14, the magnetization of the reproducing layer 13 is inverted integrally with the memory layer 14. That is, an information signal is recorded on the magneto-optical disk as the direction of magnetization of the reproducing layer 13 and the memory layer 14.

When an information signal is reproduced from the magneto-optical disk, the magneto-optical disk is irradiated with a laser beam having a light intensity weaker than that of the foregoing low-level laser beam to prevent adverse influence on the state of magnetization of each layer. In accordance with a reflected laser beam, the state of magnetization of the reproducing layer 13 and the memory layer 14 is detected. Thus, the information signal recorded as the direction of magnetization of the reproducing layer 13 and the memory layer 14 is reproduced. That is, only the reproducing layer 13 and the memory layer 14 of the magneto-optical disk contribute to storage of the recorded information signal. The other layers of the magneto-optical disk are layers for enabling the light-intensity-modulation direct overwrite to be performed.

Condition of Each Layer for Forming Magneto-Optical Disk

A preferred condition of each of the layers forming the above-mentioned magneto-optical disk which is capable of performing light-intensity-modulation direct overwrite will now be described.

First Dielectric Layer and Second Dielectric Layer

The first dielectric layer 12 uses a multiple interference effect to adjust the optical characteristics, such as the reflectance, the phase compensation quantity and effective Kerr rotation angle.

The optical characteristics can be obtained by optical calculations if the wavelength of a laser beam for use in the reproducing operation and the optical constant of each layer are given. As a result, the optimal thickness of the first dielectric layer 12 can be obtained. When the wavelength of the laser beam for use in the reproducing operation is, for example, 680 nm and the first dielectric layer 12 is formed by SiN having a refraction factor of about 2.0 to about 2.1, it is preferable that the thickness of the first dielectric layer 12 be about 55 nm to about 75 nm.

The first dielectric layer 12 as well as serves as a base layer when the magnetic layers are formed. The magnetic anisotropy and the quality of the magnetic layers which are stacked on the first dielectric layer 12 depend on the quality of the film forming the first dielectric layer 12. Therefore, control of the quality of the film forming the first dielectric layer 12 enables the magnetic anisotropy of the magnetic layer and the quality of the film forming the magnetic layer to be adjusted.

The influence of the quality of the film which forms the first dielectric layer 12 was investigated in such a way that the first dielectric layers 12 having the same optical constant and different quality of the films for forming the first dielectric layer 12 was formed by adjusting the condition under which the first dielectric layer 12 was formed. Then, magnetic layers are formed under the same condition so that samples were manufactured to evaluate the recording and reproducing characteristic of the samples. The structure of each sample is the same as that of the magneto-optical disk shown in FIG. 1.

Figure 7:
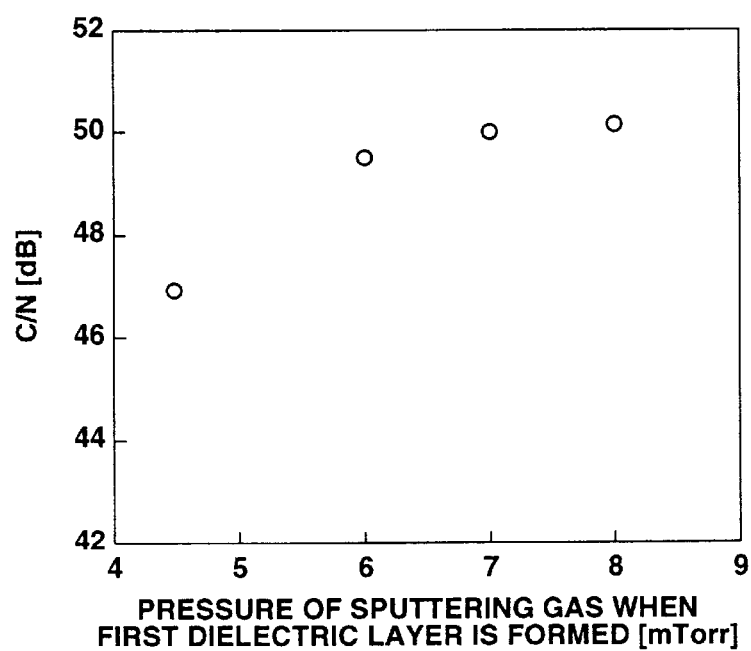
FIG. 7 is a graph showing the relationship between the pressure of sputtering gas and C/N when a first dielectric layer is formed.

The first dielectric layer 12 was formed by a reactive RF sputtering process in which a Si target was used and mixed gas of Ar and $N_2$ was employed as the sputtering gas. At this time, the mixture ratio of Ar and $N_2$ was made to be $Ar/N_2=4/1$ to 3/1 in terms of the flow rate, and power of 2.5 kW was supplied to the Si target. The quality of the film forming the first dielectric layer 12 was changed by a method in which the pressure of the sputtering gas for use in the process for forming the film was changed and which was employed because of easy control. That is, the pressure of the sputtering gas for use when the first dielectric layer 12 made of SiN was formed was changed and the other conditions were the same so that a plurality of the samples were manufactured. Note that the mixture ratio of the sputtering gas composed of Ar and $N_2$ was arbitrarily adjusted in a range of the flow ratio $Ar/N_2$ from 4/1 to 3/1 in order to make the optical constant of the first dielectric layer 12 to be constant regardless of the pressure of the sputtering gas. The C/N realized by the manufactured samples when a repeated pattern having a mark length of 0.64 $\mu$m was recorded was measured. A result is shown in FIG. 7.

In general, the magneto-optical disk must realize C/N which is about 48 dB or higher. When the pressure of the sputtering gas when the first dielectric layer 12 is formed is 4.5 mTorr, an unsatisfactory C/N of about 47 dB is obtained, as shown in FIG. 7. When the pressure is 6 mTorr or higher, a C/N exceeding 49 dB can be obtained. As a result, it is preferable that the condition, under which the first dielectric layer 12 is formed, is such that the pressure of the sputtering gas is 6 mTorr or higher.

Since the second dielectric layer 19 is formed on the magnetic layer, the second dielectric layer 19 does not adversely affect the magnetic layer as the base layer. Since the magneto-optical disk, which is capable of performing light-intensity-modulation direct overwrite, generally has a large total thickness of the magnetic layers, which is about 100 nm. Therefore, the second dielectric layer 19 does not optically affects the magnetic layer because the second dielectric layer 19 is formed adjacent to the initializing layer 18, that is, the second dielectric layer 19 is formed opposite to the surface on which a laser beam for use to perform a recording operation or a reproducing operation is made incident.

The above-mentioned second dielectric layer 19 serves as a protective film for protecting the magnetic layers and a layer for controlling heat transmission from the magnetic layer to the heat conducting layer 20.

Therefore, it is preferable that the second dielectric layer 19 has a closely-packed film as much as possible to improve the function as the protective film and raise the heat conductivity. Therefore, when the second dielectric layer 19 is formed by sputtering, it is preferable that the pressure of the sputtering gas be lowered.

Also the pressure of the sputtering gas for use in the film forming process affects the film forming rate. In general, the film forming rate is raised in inverse proportion to the pressure of the sputtering gas. Therefore, it is preferable that the pressure of the sputtering gas for use when the second dielectric layer 19 is formed be a low pressure in another viewpoint of shortening time required to form the second dielectric layer 19.

However, if the pressure of the sputtering gas for use in the film forming process is lowered excessively, excessive large stress is generated in the formed film and thus a problem is raised in that a crack is formed in the film. Therefore, the pressure of the sputtering gas for use to form the second dielectric layer 19 cannot be lowered excessively. Specifically, it is not preferable that the pressure is made to be a level not higher than about 3 mTorr.

As a result, it is preferable that the pressure of the sputtering gas for use in forming the second dielectric layer 19 be about 4.5 mTorr. It is preferable that the pressure of the sputtering gas for use when the first dielectric layer 12 is formed be 6 mTorr or higher. Therefore, it is preferable that the pressure of the sputtering gas for use when the first dielectric layer 12 is formed is high and the pressure of the sputtering gas for use when the second dielectric layer 19 is formed is low in a case where the first dielectric layer 12 and the second dielectric layer 19 are formed by sputtering.

Reproducing Layer

The reproducing layer 13 is a layer for improving the reproducing characteristic and thus the reproducing layer 13 is required to attain a Kerr rotation angle greater than that obtainable from the memory layer 14.

The Kerr rotation angle correlates to the Curie temperature such that the Kerr rotation angle is enlarged in proportion to the Curie temperature. Therefore, the Curie temperature of the reproducing layer 13 must be higher than that of the memory layer 14. It is preferable that the reproducing layer 13 be structured such that reduction in the Kerr rotation angle occurring when the temperature is raised is restrained to obtain a sufficiently large Kerr rotation angle even if the temperature is raised attributable to application of the reproducing laser beam. Note the temperature raised attributable to application of the reproducing laser beam is hereinafter called a reproducing temperature. Since the magnetization of the reproducing layer 13 must be inverted together with the memory layer 14, it is preferable that the magnetic anisotropy of the reproducing layer 13 be reduced as much as possible.

It is preferable that the reproducing layer 13, which must satisfy the foregoing requirements, be made of rare earth-transition metal amorphous alloy, specifically TMrich GdFeCo.

The Curie temperature of the rare earth-transition metal amorphous alloy, such as GdFeCo which contains Co, can be adjusted by changing the quantity of Co. The Curie temperature can be raised in proportion to the quantity of Co. Therefore, the quantity of Co is required to be enlarged to enlarge the Kerr rotation angle.

When the recording operation is performed, the magnetization recorded on the recording layer 16 is transferred to the memory layer 14 and the reproducing layer 13 through the intermediate layer 15. The Curie temperature of the reproducing layer 13 affects the above-mentioned transferring operation.

Assuming that the magnetization of the reproducing layer 13 at the transferring temperature is Ms (R), that of the memory layer 14 is Ms (M), the coercive force of the memory layer 14 is Hc (M), the thickness of the reproducing layer 13 is h (R), that of the memory layer 14 is h (M), the external magnetic field is Hext and the interfacial magnetic domain wall energy between the intermediate layer 15 and the memory layer 14 is σw (Int), the conditional expression which permits the memory layer 14 and the reproducing layer 13 to perform the transferring operation is expressed by the following formula (1). The left side of the following formula is a term indicating the interaction with the external magnetic field. When the foregoing term is enlarged, the transferring operation cannot easily be performed.

$$2\{Ms(R)h(R)+Ms(M)h(M)\}\text{Hext}<\sigma w(\text{Int})-2Ms(M)Hc(M)h(M) \quad (1)$$

If the degree of magnetization is the same at room temperature, the magnetization Ms (R) of the reproducing layer 13 at the transferring temperature is enlarged in proportion to the Curie temperature. In this case, the transferring operation cannot easily be performed. That is, if the Curie temperature of the reproducing layer 13 is raised excessively, the transferring operation of the memory layer 14 and the reproducing layer 13 cannot normally be performed when a recording operation is performed. As a result, a normal direct overwrite operation cannot be performed. As a result, C/N is lowered and thus the quality of the signal deteriorates.

Therefore, when the reproducing layer 13 is made of rare earth-transition metal amorphous alloy, such as GdFeCo containing Co, it is preferable that the quantity of Co be large in view of enlarging the Kerr rotation angle as described above. However, an upper limit for the quantity of Co exists because the transferring operation of the memory layer 14 and the reproducing layer 13 must be performed normally when a recording operation is performed.

Figure 8:
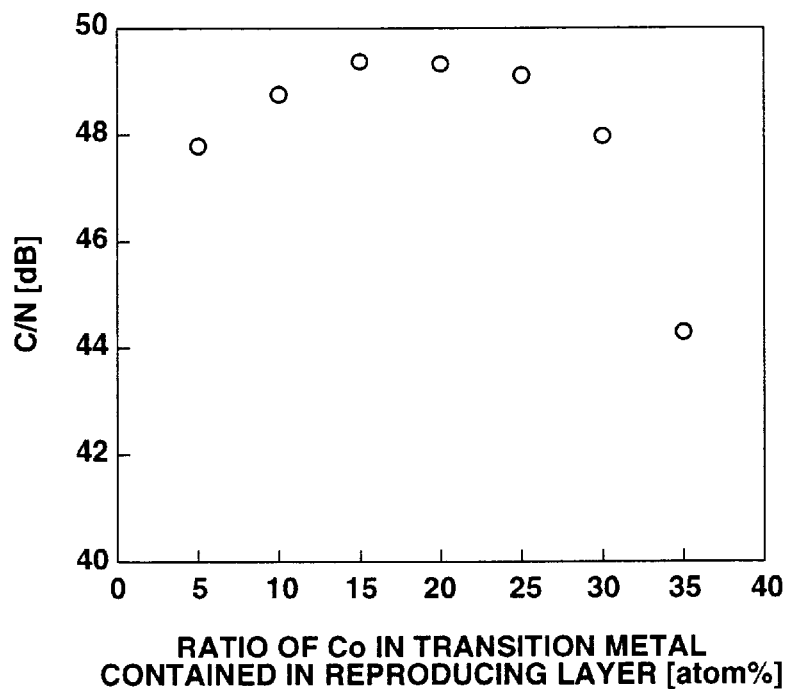
FIG. 8 is a graph showing the relationship between the ratio of Co in a transition metal element contained in a reproducing layer and C/N.

Accordingly, a plurality of samples were manufactured by changing the quantity of Co in the reproducing layer 13 and by making the other structures to be the same as those of the magneto-optical disk shown in FIG. 1 to measure C/N realized when a repeated pattern having a mark length of 0.64 μm was recorded. A result of the measurement is shown in FIG. 8. As a result, a fact can be understood that the C/N exceeding 48 dB or higher can be obtained by making the ratio of Co in the transition metal contained in the reproducing layer 13 to be 10 atom % to 25 atom %.

The magnetization Ms (R) of the reproducing layer 13 as well as depends on the TM/RE of the reproducing layer 13. If the TM/RE of the reproducing layer 13 is enlarged excessively, the magnetization Ms (R) of the reproducing layer 13 at the transferring temperature is enlarged. As a result, the above-mentioned formula (1) cannot easily be satisfied similarly to the structure in which the quantity of Co is enlarged excessively. As a result, the transferring operation cannot normally be performed.

Figure 9:
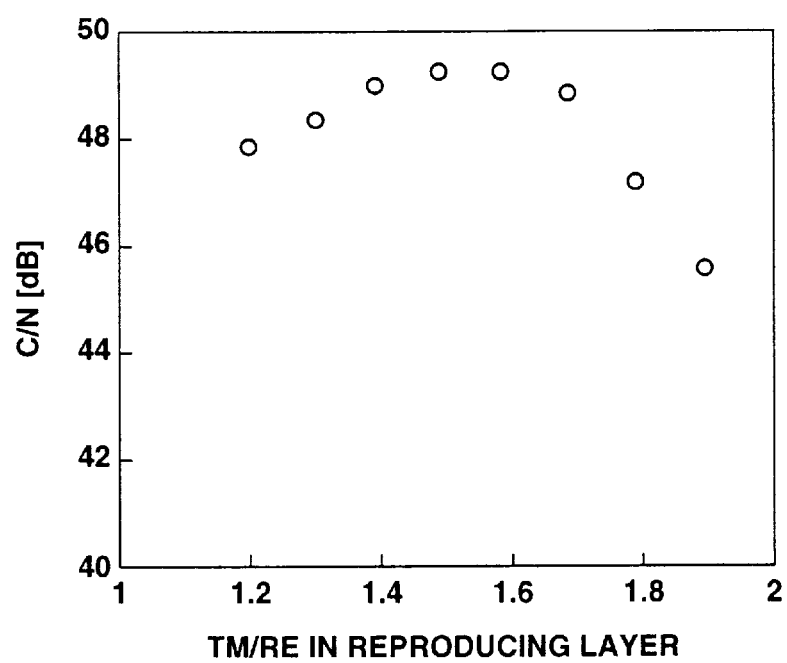
FIG. 9 is a graph showing the relationship between TM/RE of the reproducing layer and C/N.

Accordingly, a plurality of samples were manufactured by changing only TM/RE of the reproducing layer 13 and by making the other structures to be similar to those of the magneto-optical disk shown in FIG. 1. Then, C/N realized when a repeated pattern having a mark length of 0.64 μm was recorded was measured. A result of the measurement is shown in FIG. 9. As a result, a fact can be understood that the C/N exceeding 48 dB can be obtained by making the TM/RE of the reproducing layer 13 to be in a range from 1.25 to 1.7. That is, it is preferable that the TM/RE of the reproducing layer 13 be in a range from 1.25 to 1.7.

In order to obtain the effect of improving the reproducing characteristic from the reproducing layer 13, the reproducing layer 13 must have a thickness not smaller than 10 nm. If the thickness is too large, the above-mentioned formula (1) cannot be satisfied. That is, the thickness of the reproducing layer 13 must be in a range which satisfies the above-mentioned formula (1). The upper limit of the thickness is determined by the above-mentioned formula (1).

Memory Layer

Since the memory layer 14 is a layer for storing recorded signals, an interfacial magnetic domain wall must be formed between the memory layer 14 and the intermediate layer 15 at room temperature and a temperature near the reproducing temperature to stably maintain the recording magnetic domain. Assuming that the magnetization of the memory layer 14 at a temperature near a room temperature is Ms (M), the coercive force of the memory layer 14 is Hc (M), the thickness of the memory layer 14 is h (M) and the interfacial magnetic domain wall energy between the intermediate layer 15 and the memory layer 14 is σw (Int), the conditional expression which permits the memory layer 14 to stably maintain the recording magnetic domain is expressed by the following formula (2):

$$2Ms(M)Hc(M)h(M) > \sigma w(Int) \qquad (2)$$

Therefore, the memory layer 14 is able to stably maintain the recording magnetic domain at a temperature near a room temperature when the product of the magnetization Ms (M) and the coercive force Hc (M) of the memory layer 14, that is product MsHc is enlarged or when the interfacial magnetic domain wall energy σw (Int) between the intermediate layer 15 and the memory layer 14 is reduced.

It is preferable that the memory layer 14, which must satisfy the foregoing requirements, be made of rare earth-transition metal amorphous alloy. Among various rare earth-transition metal amorphous alloys, it is preferable that TbFeCo having great magnetic anisotropy and a large product of MsHc be employed.

The memory layer 14 must be formed in such a manner that the magnetization of the memory layer 14 is inverted by the interfacial magnetic domain wall energy between the memory layer 14 and the intermediate layer 15 at a temperature near the transferring temperature in order to cause the magnetization of the recording layer 16 to be transferred through the intermediate layer 15 when a recording operation is performed. That is, the above-mentioned formula (1) must be satisfied at a temperature near the transferring temperature. To achieve this, it is preferable that the magnetization of the memory layer 14 at a temperature near the transferring temperature be small. When the magnetization of the memory layer 14 at a temperature near the transferring temperature is reduced as described above, the left side of the above-mentioned formula (1) can be reduced and thus the formula (1) can easily be satisfied.

The magnetization of the rare earth-transition metal amorphous alloy at high temperatures is usually reduced in a state of RErich. Therefore, it is preferable that the memory layer 14 is made of RErich rare earth-transition metal amorphous alloy. As a result, the magnetization of the memory layer 14 at a temperature near the transferring temperature can be reduced and thus the transferring operation can satisfactorily be performed.

If the sublattice magnetization of the rare earth element is enlarged excessively, the Curie temperature Tc and the compensation temperature Tcomp approach excessively and thus noise is intensified. Therefore, when the memory layer 14 is made of the RErich rare earth-transition metal amorphous alloy, an optimal range exists for its composition.

Accordingly, a plurality of samples were manufactured by changing only TM/RE of the memory layer 14 and by making the other structures to be the same as those of the magneto-optical disk shown in FIG. 1 to measure the maximum recording magnetic field and C/N realized when a repeated pattern having a mark length of 0.64 μm was recorded.

The maximum recording magnetic field is the maximum value of the magnetic field which can be applied when a recording operation is performed. The light-intensity-modulation direct overwrite is performed in such a way that a magnetic field is applied from outside when the recording operation is performed. The memory layer 14 must be formed in such a manner that the magnetization of the recording layer 16 is transferred through the intermediate layer 15 at the transferring temperature regardless of the existence of the external magnetic field. However, if the external magnetic field is too large, the transferring operation cannot normally be performed. Therefore, the magnetic field, which is applied from outside when the recording operation is performed, must have an intensity with which the transferring operation can normally be performed. The maximum value of the magnetic field is the maximum recording magnetic field.

Figure 10:
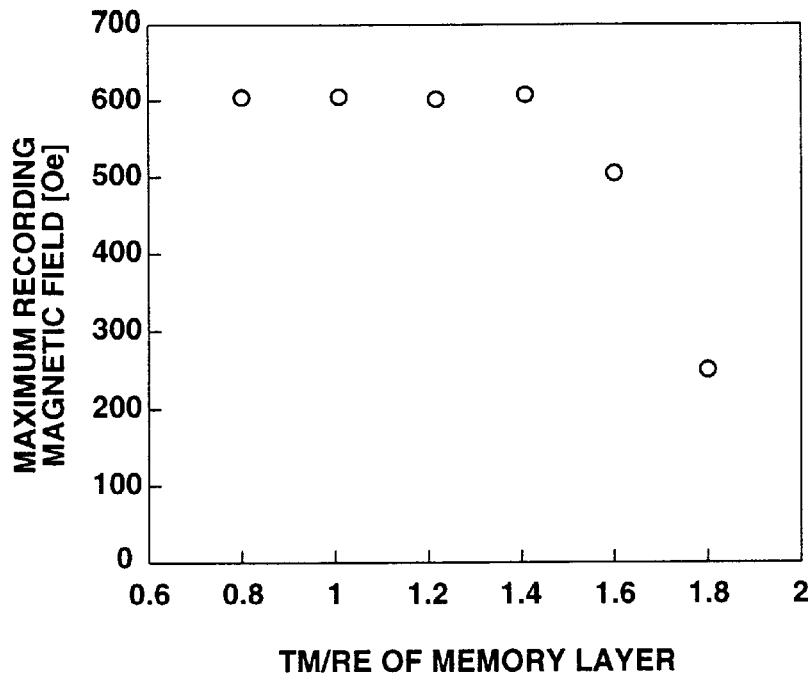
FIG. 10 is a graph showing the relationship between TM/RE of a memory layer and a maximum recording magnetic field.
Figure 11:
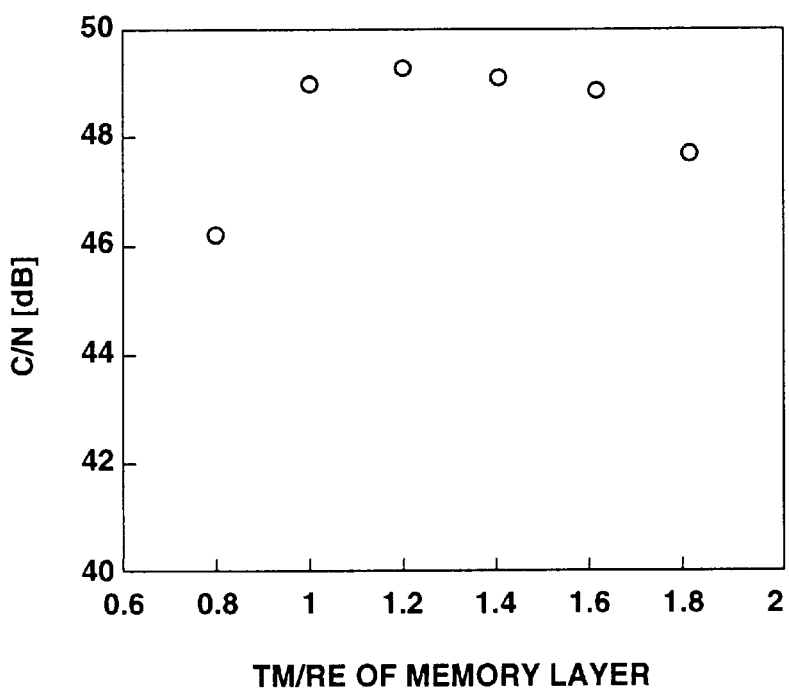
FIG. 11 is a graph showing the relationship between TM/RE of the memory layer and C/N.

A result of detection of the relationship between the maximum recording magnetic field and TM/RE of the memory layer 14 is shown in FIG. 10. A result of detection of the relationship between C/N and TM/RE of the memory layer 14 is shown in FIG. 11.

A fact can be understood from the foregoing results that a sufficiently large maximum recording magnetic field can be obtained and C/N not lower than 48 dB can be obtained when TM/RE of the memory layer 14 is in a range from 1.0 to 1.4. That is, it is preferable that the memory layer 14 is formed in such a manner that TM/RE is in a range from 1.0 to 1.4 and the memory layer 14 has a RErich structure. As a result, the transferring characteristic can be improved without considerably adverse influence on the recording characteristic.

When the memory layer 14 is made of the rare earth-transition metal amorphous alloy containing Co, change of the quantity of Co in the memory layer 14 causes the temperature at which the magnetization of the recording layer 16 is transferred to the memory layer 14 through the intermediate layer 15 to be changed. Since the transferring temperature as well as considerably affects the reproduction stability, the lower limit of the quantity of Co in the memory layer 14, which is an important parameter for determining the transferring temperature is determined from a viewpoint of realizing reproduction stability.

In order to practically use the magneto-optical disk, repeated reproduction durability exceeding $10^8$ times or more is required. Assuming that the environmental temperature is 55° C., the linear velocity is 9.42 m/s, the wavelength of a laser beam for use in the reproducing operation is 680 nm and the power of the laser beam is 1.5 mW, the ratio of Co in the transition metal element contained in the memory layer 14 must be 4 atom % or higher in order to realize the repeated reproduction durability exceeding $10^8$ times or more.

Although the upper limit of the quantity of Co is determined by the recording sensitivity and the power margin, it is generally preferable that the ratio of Co in the transition metal element contained in the memory layer 14 be about 9 atom % or lower.

That is, when the memory layer 14 is made of the rare earth-transition metal amorphous alloy containing Co, it is preferable that the ratio of Co in the transition metal element contained in the memory layer 14 be 4 atom % to 9 atom %.

Although the thickness of the memory layer 14 is required to satisfy the foregoing formulas (1) and (2), it is preferable that the thickness is 10 nm or greater to realize durability against repeated recording operations.

Intermediate Layer

The most important object of the intermediate layer 15 is to reduce the interfacial magnetic domain wall energy at a temperature near a room temperature to stabilize the recording magnetic domain formed in the memory layer 14.

Assuming that the exchange stiffness constant is A, vertical magnetic anisotropy is Ku and magnetization is Ms, the interfacial magnetic domain wall energy σw is expressed by the following formula (3). The interfacial magnetic domain wall energy σw is reduced in proportion to the vertical magnetic anisotropy Ku and in inverse proportion to magnetization Ms.

$$\sigma w = \{A(Ku - 2\pi Ms^2)\}^{1/2} \quad (3)$$

Therefore, the intermediate layer 15 must have a small vertical magnetic anisotropy Ku and large magnetization Ms at a temperature near a room temperature in order to stabilize the recording magnetic domain.

In a viewpoint of transferring the magnetization of the recording layer 16 to the memory layer 14 through the intermediate layer 15, the above-mentioned formula (1) must easily be satisfied. Therefore, it is preferable that the interfacial magnetic domain wall energy σw (Int) at the transferring temperature be large energy. Dependency of the vertical magnetic anisotropy Ku and exchange stiffness constant A on the temperature are substantially determined by the material. In general, the tendency of the temperature dependency is monotonously decreased with rise in the temperature. As can be understood from formula (3), the magnetization Ms of the intermediate layer 15 must be reduced as much as possible at a temperature near the transferring temperature in order to enlarge the interfacial magnetic domain wall energy σw (Int) at a temperature near the transferring temperature.

In order to realize the above-mentioned dependency of the magnetization on the temperature, the intermediate layer 15 has been made of RErich rare earth-transition metal amorphous alloy.

Although the RErich intermediate layer 15 is advantageous from a viewpoint of transferring the magnetization of the recording layer 16 to the memory layer 14 through the intermediate layer 15, the recording layer 16 must be magnetized prior to performing the transferring operation when the light-intensity-modulation direct overwrite is performed. Therefore, there arises a problem from a viewpoint of the above-mentioned recording characteristic.

Accordingly, the relationship between the composition of the intermediate layer 15 and the recording characteristic was investigated in such a manner that a plurality of samples were manufactured by changing only TM/RE of the intermediate layer 15 and by making the other structures to be the same as those of the magneto-optical disk shown in FIG. 1 to measure C/N realized when a repeated pattern having a mark length of 0.64 μm was recorded under a recording magnetic field of 200 Oe. A result of the measurement is shown in FIG. 12.

As can be understood from the above-mentioned result, C/N is lowered undesirably if the ratio of the rare earth element contained in the intermediate layer 15 is raised. Although the above-mentioned problem can somewhat be prevented by intensifying the recording magnetic field, recording must satisfactorily be performed with the recording magnetic field of about 200 Oe in order to realize a practical drive requiring small electric power consumption. Therefore, the intermediate layer 15 must be structured in such a manner that TM/RE is 1.4 or higher and the composition of the intermediate layer 15 is TMrich structure although the transferring characteristic somewhat deteriorates.

Figure 14:
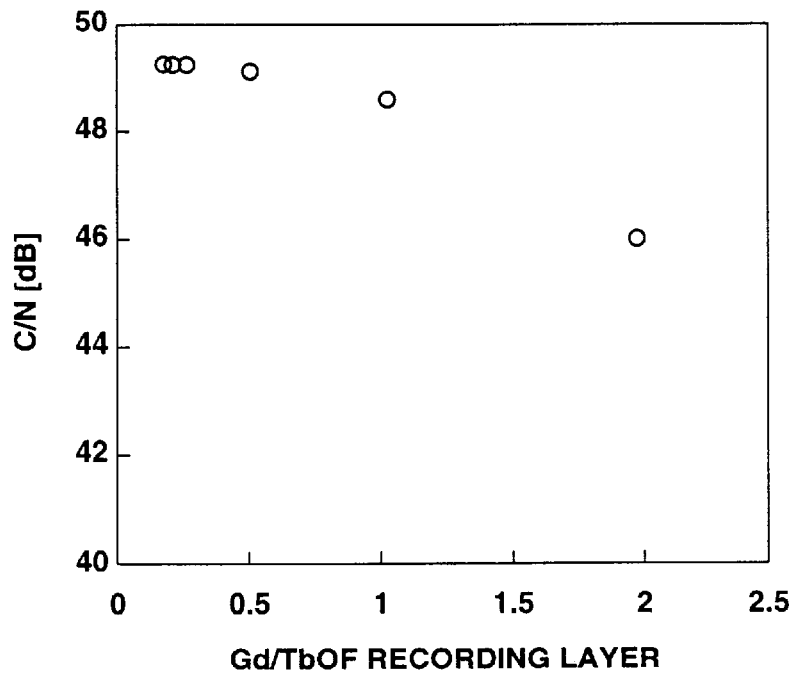
FIG. 14 is a graph showing the relationship between Gd/Tb of a recording layer and C/N.

Results of measurement of the maximum recording magnetic field of the above-mentioned samples are shown in FIG. 14. Note that the maximum recording magnetic field determines the quality of the transferring characteristic such that the transferring characteristic can be improved in proportion to the maximum recording magnetic field. As can be understood from FIG. 14, the magneto-optical disk having the structure as shown in FIG. 1 has the maximum recording magnetic field of 600 Oe or greater if the TM/RE is 2.0 or lower. Therefore, even if the TMrich structure is employed, the magneto-optical disk of the foregoing type is able to have a satisfactory transferring characteristic. A reason why the maximum recording magnetic field shown in FIG. 14 is a constant value of 600 Oe when the TM/RE is 2 or lower lies in that the measurement permitted range for the machine for measuring the maximum recording magnetic field is limited to 600 Oe. It can be considered that the maximum recording magnetic field exceeds 600 Oe when TM/RE is 2 or lower.

Figure 12:
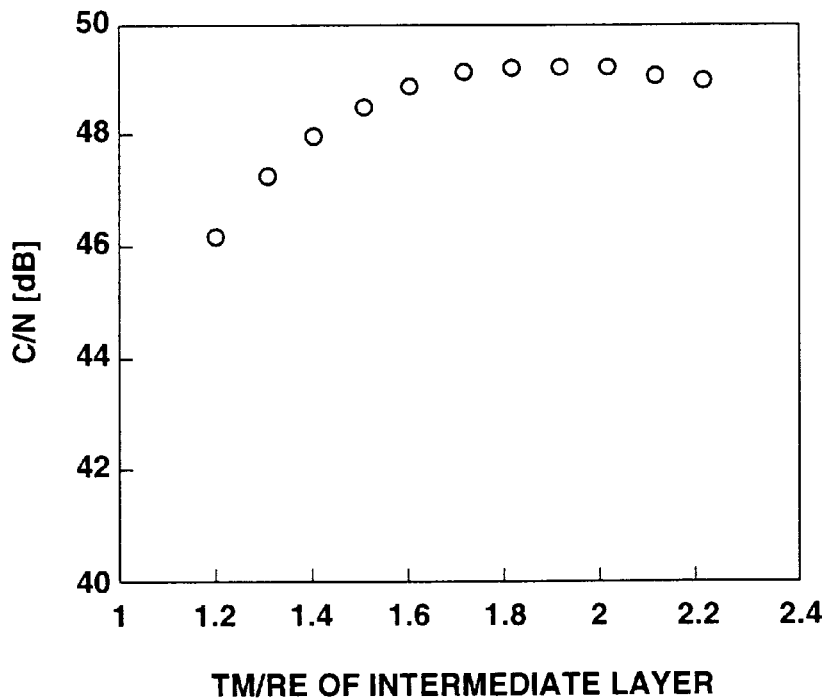
FIG. 12 is a graph showing the relationship between TM/RE of an intermediate layer and C/N.
Figure 13:
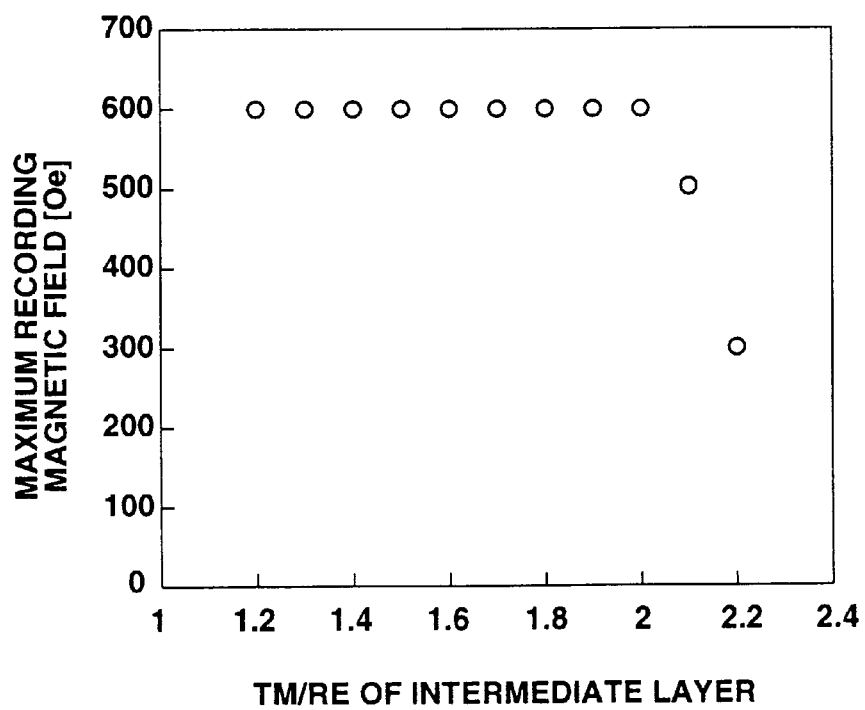
FIG. 13 is a graph showing the relationship between TM/RE of the intermediate layer and maxim recording magnetic field.

As can be understood from the results shown in FIGS. 12 and 13, it is preferable that the intermediate layer 15 is formed into the TMrich structure arranged in such a manner that the TM/RE is in a range from 1.4 to 2.0. When the intermediate layer 15 is formed into the TMrich structure, the sensitivity of the recording magnetic field and the quality of the signal can be improved.

If the Curie temperature of the intermediate layer 15, which considerably affects the recording characteristics, is raised to a level similar or higher than the Curie temperature of the recording layer 16, a further considerably influence is made on the recording characteristic. Thus, the ranges of the composition and thickness with which the effect of improving the recording characteristic can be improved are reduced unsatisfactorily. As a result, the range for the composition for maintaining the transferring characteristic and the stability of the recording magnetic domain and the range for the composition with which the recording characteristic can be improved do not coincide with each other. Therefore, the Curie temperature of the intermediate layer 15 be lowest possible level. To realize this, the quantity of Co in the intermediate layer 15 must be reduced as much as possible.

Therefore, it is preferable that the material of the intermediate layer 15 be rare earth-transition metal amorphous alloy containing no Co. Specifically, a preferred material is GdFe. If Co is added to the intermediate layer 15, it is preferable that the quantity of Co be minimized in a viewpoint of improving the recording characteristic. If the intermediate layer 15 is made of GdFeCo, it is preferable that the ratio of Co in the transition metal element contained in the intermediate layer 15 be 5 atom % or lower in order to lower the Curie temperature of the intermediate layer 15.

The composition and thickness of the intermediate layer 15 considerably affect the stability of the recording magnetic domain, the recording characteristic and the like. Therefore, the composition and thickness of the intermediate layer 15 must possibly be uniform in one magneto-optical disk or among a multiplicity of magneto-optical disks which are produced as the same products. When a multiple-target sputtering process is employed in which sputtering of a plurality of targets is simultaneously performed to form films, the composition and thickness cannot easily be made to be uniform. Therefore, it is preferable that the thickness of the intermediate layer 15 be 10 nm or larger in order to make the composition and thickness of the intermediate layer 15 to be uniform.

Recording Layer

The recording layer 16 must have uniform recording magnetic domain which is formed when the recording layer 16 is magnetized when the recording operation is performed. Moreover, the recording magnetic domain can accurately be transferred to the memory layer 14. In addition, the recording layer 16 must uniformly be initialized by the initializing layer 18 after the recording magnetic domain has been transferred to the memory layer 14.

In the viewpoint of forming uniform recording magnetic domain, it is preferable that the magnetic anisotropy of the recording layer 16 be enlarged as much as possible. In the above-mentioned viewpoint, TbFeCo is suitable as the material of the recording layer 16.

Assuming that the magnetization of the recording layer 16 is Ms (W), the coercive force of the recording layer 16 is Hc (W), the thickness of the recording layer 16 is h (W), the interfacial magnetic domain wall energy between the intermediate layer 15 and the memory layer 14 is σw (Int) and the interfacial magnetic domain wall energy between the recording layer 16 and the switching layer 17 is σw (Sw), the conditional expression for initializing the recording layer 16 is expressed by the following formula (4):

$$2Ms(W)Hc(W)h(W) < \sigma w(Sw) - \sigma w(Int) \tag{4}$$

As can be understood from the foregoing formula (4), it is preferable that the magnetic anisotropy of the recording layer 16 be reduced to reliably initialize the recording layer 16.

As described above, the recording layer 16 must satisfy two contrary requirements. Therefore, it is preferable that the recording layer 16 is made of GdTbFeCo composed of Gd, Tb, Fe and Co and the ratio Gd/Tb of the quantity of the formed Gd film and that of the formed Tb film is adjusted to make the magnetic anisotropy of the recording layer 16 to be optimal.

Accordingly, a plurality of samples were manufactured by changing only Gd/Tb of the recording layer 16 and by making the other structures to be the same as those of the magneto-optical disk shown in FIG. 1 to measure C/N realized when a repeated pattern having a mark length of 0.64 μm was recorded. A result of the measurement is shown in FIG. 14. As can be understood from the results, it is preferable that Gd/Tb of the recording layer 16 be lower than 1/1 to improve the recording characteristic.

Then, the initializing characteristic of the samples were investigated whether or not the initialization can be performed when a recording operation is performed. Results of the investigation is shown in Table 2. In Table 2, mark o indicates normal initialization and mark X indicates impossibility of the initialization because the initialization was not performed normally.

TABLE 2

| Gd/Tb | 1/1 | 1/2 | 1/3 | 1/4 | 1/5 | 1/6 |
|---|---|---|---|---|---|---|
| Initializing Characterisitic | ○ | ○ | ○ | ○ | X | X |

As can be understood from the foregoing results, it is preferable that Gd/Tb of the recording layer 16 be larger than 1/5 to improve the initializing characteristic.

When the light-intensity-modulation direct overwrite is performed by using an initializing magnet, the TM/RE of the recording layer 16 is determined by the intensity of the initializing magnetic field and the recording characteristic of the recording layer 16. The magneto-optical recording medium according to the present invention and comprising the initializing layer 18 does not require the initializing magnet. In this case, the condition under which the recording layer 16 is initialized is as expressed in the foregoing formula (4).

As can be understood from the foregoing formula (4), the product of the saturation magnetization Ms (W) and the coercive force Hc (w) of the recording layer 16, that is, the product MsHc of the recording layer 16 is an important factor to realize a satisfactory initializing operation for a magneto-optical recording medium of the type having the initializing layer 18 and thus enabling the light-intensity-modulation direct overwrite to be performed. When the magnetic material and the film forming condition are determined, the product of MsHc is made to be a substantially constant value regardless of TM/RE. Therefore, TM/RE of the recording layer 16 may be any value in the viewpoint of performing the initializing operation. Therefore, TM/RE of the recording layer 16 of the magneto-optical recording medium having the initializing layer 18 and thus enabling the light-intensity-modulation direct overwrite to be performed may be determined from only the viewpoint of improving the recording characteristic.

Figure 15:
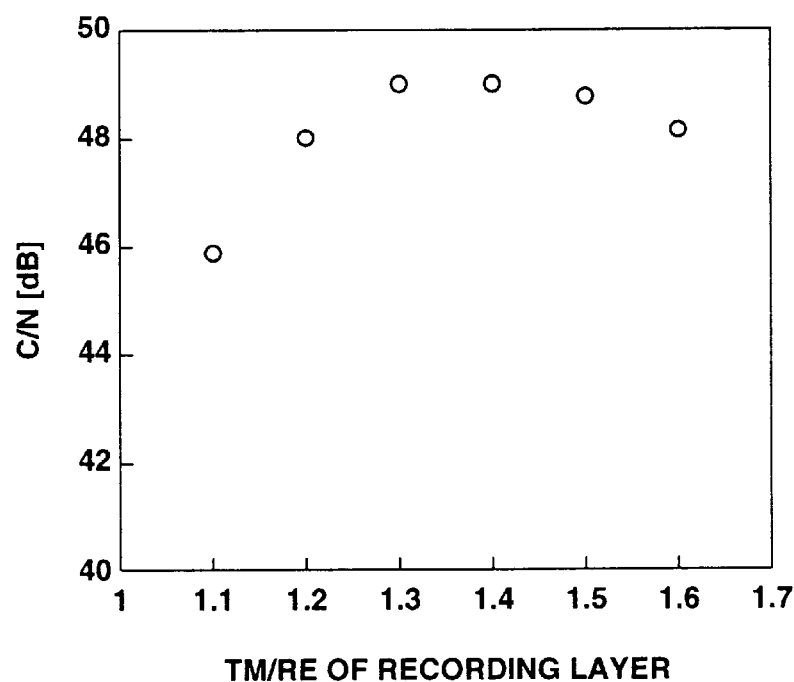
FIG. 15 is a graph showing the relationship between TM/RE of the recording layer and C/N.

Accordingly, a plurality of samples were manufactured by changing only TM/RE of the recording layer 16 and by making the other structures to be the same as those of the magneto-optical disk shown in FIG. 1 to measure C/N realized when a repeated pattern having a mark length of 0.64 μm was recorded. A result of the measurement is shown in FIG. 15. As can be understood from the foregoing results, C/N higher than 48 dB can be obtained when the TM/RE of the reproducing layer 13 is in the range from 1.2 to 1.4 and the reproducing layer 13 is formed into the TMrich structure. That is, it is preferable that the recording layer 16 be formed in such a way that TM/RE is in a range from 1.2 to 1.4 and the structure is the TMrich form. When the recording layer 16 is formed into the TMrich structure, the sensitivity of the recording magnetic field and the quality of the signal can be improved.

As described above, the Curie temperature of the rare earth-transition metal amorphous alloy containing Co is raised in proportion to the quantity of Co. Therefore, when the recording layer 16 is made of the rare earth-transition metal amorphous alloy containing Co, it is preferable that the quantity of Co, which is added, be enlarged as much as possible to maintain a margin for performing a recording operation with a low-level laser beam.

Since the energy of the laser beam with which the medium can be irradiated is limited because of the maximum output of the semiconductor laser, the efficiency of the optical system which can be mounted on the recording and reproducing apparatus and the number of revolutions of the disk, the Curie temperature permitted for the recording layer 16 has an upper limit. Therefore, the quantity of Co which is added to the recording layer 16 has an upper limit.

In consideration of the output from the available semiconductor laser, the efficiency of the optical system and the number of revolutions of the disk, it is preferable that the ratio of Co in the transition metal element contained in the recording layer 16 be 10 atom % to 18 atom % when the recording layer 16 is made of the rare earth-transition metal amorphous alloy containing Co.

Although the thickness of the recording layer 16 is simply required to satisfy the above-mentioned formula (4), it is preferable that the thickness be 10 nm or greater similarly to the memory layer 14 to maintain durability against repeated recording operations. If the thickness of the overall magnetic layers is enlarged excessively, the recording sensitivity deteriorates and/or the dependency of the recording sensitivity on the linear velocity becomes excessively. Therefore, it is preferable that the thickness of the recording layer 16 be 30 nm or smaller to reduce the overall thickness of the magnetic layers.

Switching Layer

The object of the switching layer 17 is to reliably disconnect the exchange interaction between the recording layer 16 and the initializing layer 18 to cause the recording magnetic domain to be formed in the recording layer 16 when the temperature is in a range not lower than the transferring temperature. Another object of the switching layer 17 is to cause the initializing layer 18 and the recording layer 16 to be connected reliably attributable to the exchange interaction in order to initialize the recording layer 16 when the temperature is lower than the transferring temperature and higher than a room temperature.

As can be understood from the above-mentioned formula (4), it is preferable that the interfacial magnetic domain wall energy σw (SW) between the switching layer 17 and the recording layer 16 be enlarged as much as possible when the temperature is not higher than the transferring temperature. To realize this, it is preferable that TbFeCo having great magnetic anisotropy be employed to form the switching layer 17.

The composition and the Curie temperature of the switching layer 17 affect the recording characteristic (mainly the sensitivity to the recording magnetic field). Therefore, the composition of the switching layer 17 must be determined in such a manner that a satisfactory recording characteristic can be realized as well as satisfactory initializing characteristic.

Figure 16:
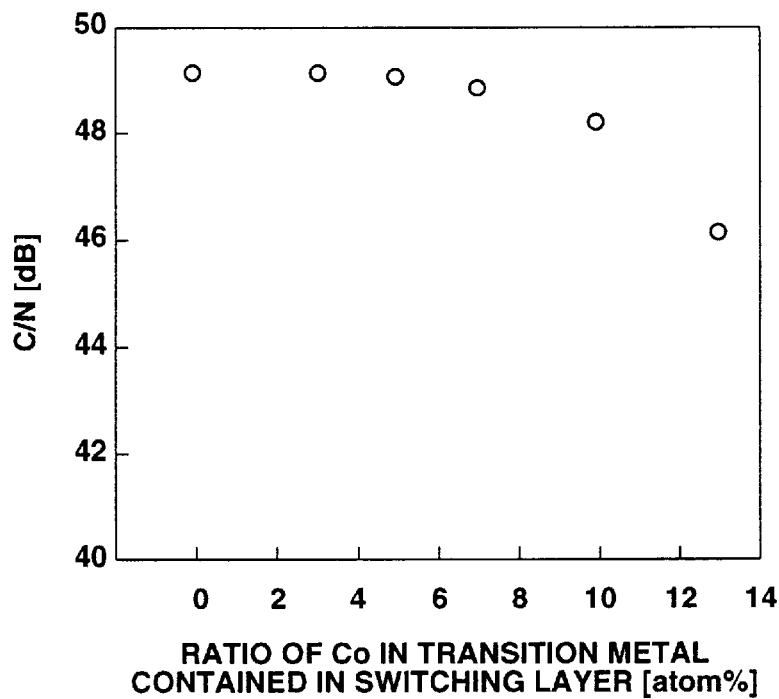
FIG. 16 is a graph showing the relationship between the ratio of Co in transition metal contained in a switching layer and C/N.

Accordingly, a plurality of samples were manufactured by changing the ratio of Co in the transition metal element contained in the switching layer 17 and by making the other structures to be the same as those of the magneto-optical disk shown in FIG. 1 to measure C/N realized when a repeated pattern having a mark length of 0.64 μm was recorded. A result of the measurement is shown in FIG. 16.

As can be understood from the above-mentioned results, C/N higher than 48 dB can be obtained when the ratio of Co in the transition metal element contained in the switching layer 17 is 0 atom % to 10 atom %. That is, it is preferable that the ratio of Co in the transition metal element contained in the switching layer 17 be 0 atom % to 10 atom %. It can be considered that the reason why C/N is lowered in a range in which the quantity of Co is larger than 10 atom % lies in that enlargement of the quantity of Co raises the Curie temperature of the switching layer 17 to cause the initializing temperature to approximate the transferring temperature. In this case, the recording layer 16 is undesirably initialized before satisfactory transference is performed.

Figure 17:
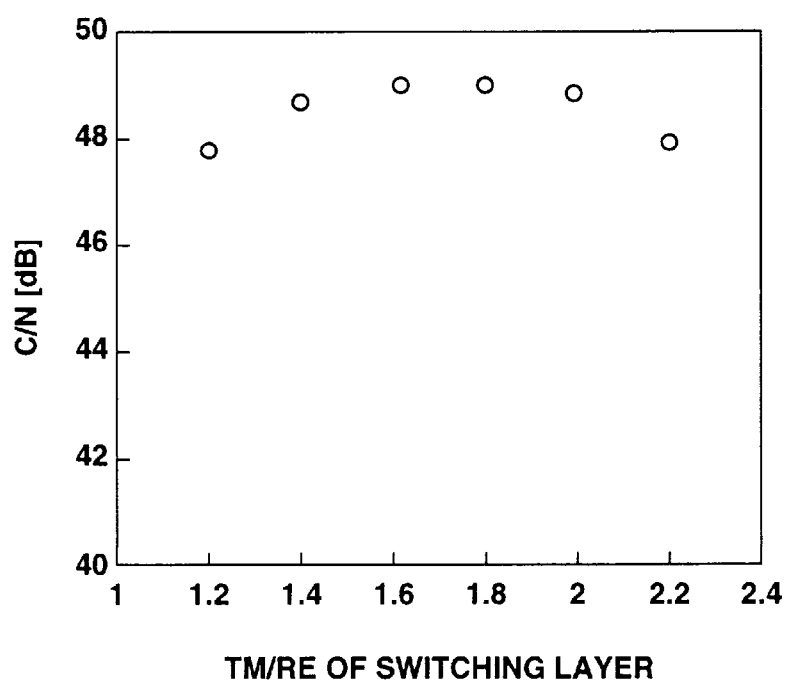
FIG. 17 is a graph showing the relationship between TM/RE of the switching layer and C/N.

To detect the optimal TM/RE for the switching layer 17, a plurality of samples were manufactured by changing only TM/RE of the switching layer 17 by making the other structures to be the same as those of the magneto-optical disk shown in FIG. 1 to measure C/N realized when a repeated pattern having a mark length of 0.64 μm was recorded under a recording magnetic field of 200 Oe. A result of the measurement is shown in FIG. 17.

As can be understood from the above-mentioned results, C/N higher than 48 dB can be obtained when TM/RE of the switching layer 17 is in a range from 1.4 to 2.0. That is, it is preferable that TM/RE of the switching layer 17 is in a range from 1.4 to 2.0. When TM/RE of the switching layer 17 of the above-mentioned samples arranged in such a way that the ratio of Co in the transition metal element contained in the switching layer 17 is 7 atom % was changed, the initializing operation was performed normally.

The composition and the thickness of the switching layer 17 considerably affect the recording characteristic. Therefore, the composition and thickness of the switching layer 17 must possibly be uniform in one magneto-optical disk or among a multiplicity of magneto-optical disks which are produced as the same products. When a multiple-target sputtering process is employed in which sputtering of a plurality of targets is simultaneously performed to form films, the composition and thickness cannot easily be made to be uniform. Therefore, it is preferable that the thickness of the switching layer 17 be 10 nm or larger in order to make the composition and thickness of the switching layer 17 to be uniform. If the overall thickness of the magnetic layers is enlarged excessively, the recording sensitivity deteriorates or the recording sensitivity excessively depends on the linear velocity. Therefore, it is preferable that the thickness of the switching layer 17 be 20 nm or smaller to reduce the overall thickness of the magnetic layers.

Initializing Layer

The initializing layer 18 is arranged to initialize the recording layer 16. That is, the initializing layer 18 serves as a reference layer when the recording layer 16 is initialized. Therefore, the magnetization of the initializing layer 18 is not inverted in any state during the direct overwrite operation and the initializing layer 18 must always be magnetized in a predetermined direction. Therefore, it is preferable that the initializing layer 18 be made of a magnetic material having great magnetic anisotropy and high Curie temperature. Specifically, it is preferable that the initializing layer 18 be made of TbFeCo.

The stability of the magnetization of the initializing layer 18 depends on TM/RE of the initializing layer 18. To detect an optimal value of TM/RE of the initializing layer 18, a plurality of samples were manufactured by changing only TM/RE of the initializing layer 18 and by making the other structures to be the same as those of the magneto-optical disk shown in FIG. 1 to measure power Peth with which inversion starts when laser beams were continuously applied to the samples. Results of the measurement are shown in FIG. 18.

Power Peth with which inversion starts is the power of the laser beam with which the magnetization of the initializing layer 18 is inverted when the laser beams are continuously applied. To put a magneto-optical disk capable of performing the light-intensity-modulation direct overwrite operation into practical use, the power Peth with which inversion starts must be about 11 mW or greater.

Figure 18:
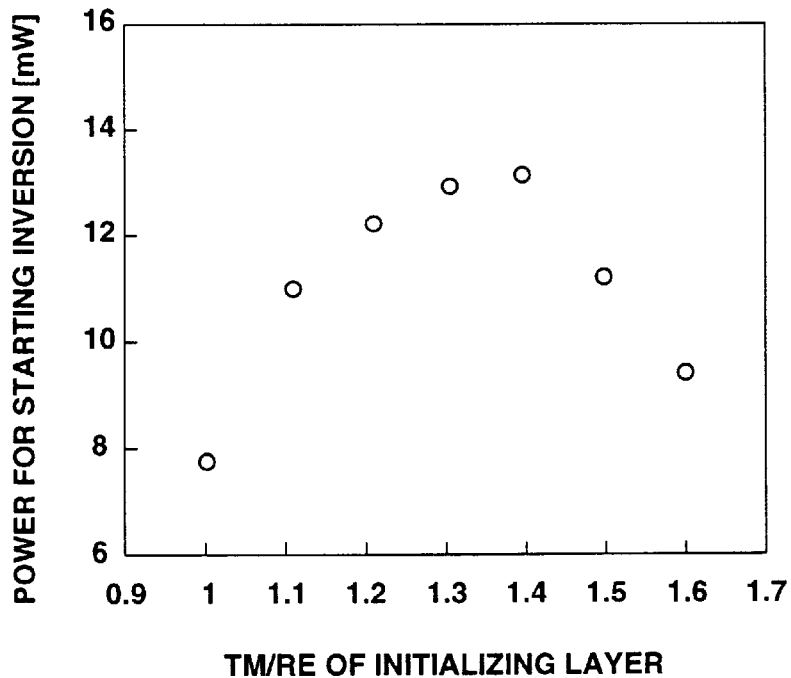
FIG. 18 is a graph showing the relationship between TM/RE of an initializing layer and power for starting inversion.

As can be understood from the results shown in FIG. 18, the power Peth with which inversion starts can be made to be 11 mW or greater when TM/RE of the initializing layer 18 is in a range from 1.2 to 1.5. That is, it is preferable that TM/RE of the initializing layer 18 be in a range from 1.2 to 1.5.

Figure 19:
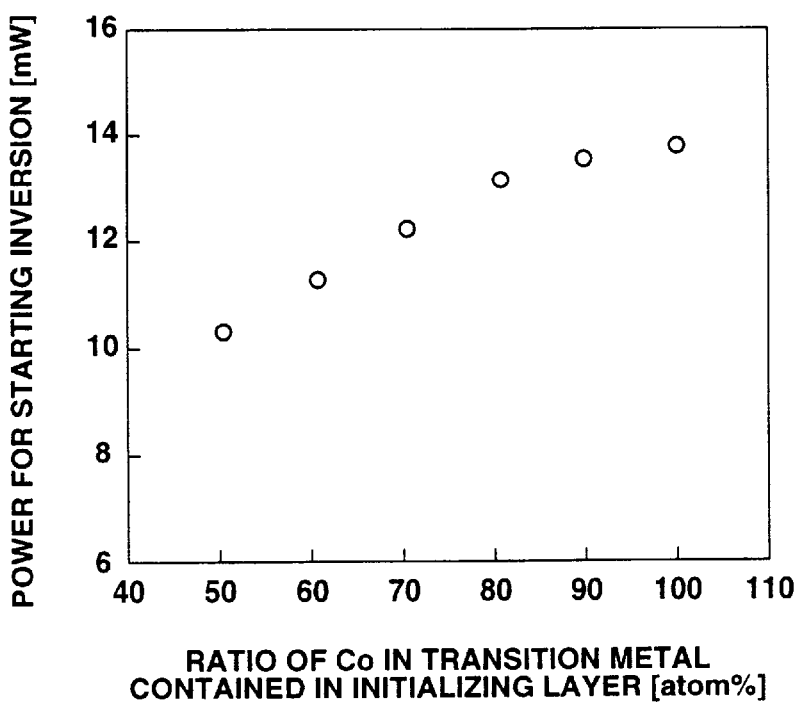
FIG. 19 is a graph showing the relationship between the ratio of Co in transition metal contained in the initializing layer and power for starting inversion.

When the initializing layer 18 is made of the rare earth-transition metal amorphous alloy containing Co, the Curie temperature of the initializing layer 18 depends on the quantity of Co. To detect an optimal quantity of Co contained in the initializing layer 18, a plurality of samples were manufactured by changing only the quantity of Co in the initializing layer 18 and by making the other structures to be the same as those of the magneto-optical disk shown in FIG. 1 to measure power Peth with which inversion starts when laser beams were continuously applied to the samples. Results of the measurement are shown in FIG. 19.

As can be understood from the above-mentioned results, the power Peth with which inversion starts can be made to be 11 mW or greater when the ratio of Co in the transition metal element contained in the initializing layer 18 is 70 atom % or higher. That is, it is preferable that the ratio of Co in the transition metal element contained in the initializing layer 18 be 70 atom % or higher.

If the quantity of Co is too large, the stable initializing layer 18 cannot easily be formed. In particular, TbCo in which only Co is contained as the transition metal element encounters a strict limitation for TM/RE with which the stable initializing layer 18 can be formed. Thus, the manufacturing margin is reduced excessively for practical use. Thus, the upper limit of the ratio of Co in the transition metal element contained in the initializing layer 18 is about 90 atom %.

Assuming that the saturated magnetization of the initializing layer 18 at a temperature near the initializing temperature is Ms (Ini), the coercive force of the initializing layer 18 is Hc (Ini), the thickness of the initializing layer 18 is h (Ini) and the interfacial magnetic domain wall energy between the switching layer 17 and the recording layer 16 is σw(Sw), the conditional expression which prevents inversion of the initializing layer 18 at the initializing temperature at which the recording layer 16 is initialized is expressed by the following formula (5):

$$2\{Ms(\text{Ini})Hc(\text{Ini})\pm Ms(\text{Ini})\text{Hext}\}h(\text{Ini}) > \sigma w(Sw) \quad (5)$$

Therefore, the thickness of the initializing layer 18 is needed to satisfy the foregoing formula (5). Specifically, it is preferable that the practical thickness be about 30 nm to 50 nm from a viewpoint of stability and recording sensitivity.

Heat Conducting Layer

The heat conducting layer 20 is formed to enlarge the power margin by reducing thermal interference in the magneto-optical disk and to restrain the dependency of the recording sensitivity on the linear velocity. Therefore, it is preferable that the heat conducting layer 20 be made of a material having a great thermal conductivity. Specifically, a preferred material is AlTi. Since AlTi is available with a low cost and enlargement of the quantity of addition of Ti lowers the thermal conductivity, the thermal conductivity can easily be adjusted by changing the quantity of Ti. Another effect can be obtained by adding Ti that corrosion can be prevented.

When the heat conducting layer 20 is made of AlTi, it is preferable that Ti be added by 0.1 wt % to 10 wt % to prevent corrosion. When also the thermal conductivity is considered, a proper quantity of Ti is about 1.5 wt %.

It is preferable that the thickness of the heat conducting layer 20 be 10 nm or greater to cause a film to be formed uniformly over the surface of the disk. To improve the recording sensitivity, it is preferable that the thickness be 60 nm or smaller.

As described above, according to the present invention, the magneto-optical recording medium can be provided which is capable of performing the light-intensity-modulation direct overwrite operation, which is able to simultaneously satisfy the characteristics, such as the sensitivity to the recording magnetic field, the quality of the signal and stability during the overwrite operation and which has excellent characteristic permitting practical use.

That is, according to the present invention, there is provided a magneto-optical recording medium simultaneously realizing an excellent function of the light-intensity-modulation direct overwrite, sensitivity to recording magnetic field and signal quality equivalent or superior to those of the conventional magneto-optical disk which cannot perform the light-intensity-modulation direct overwrite.

Moreover, the present invention is able to improve the quality of the signal and thus adaptation to a further dense recording structure is permitted.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magneto-optical recording medium comprising:
   a first magnetic layer;
   a second magnetic layer formed on said first magnetic layer;
   a third magnetic layer formed on said second magnetic layer;
   a fourth magnetic layer formed on said third magnetic layer;
   a fifth magnetic layer formed on said fourth magnetic layer; and
   a sixth magnetic layer formed on said fifth magnetic layer, wherein,
   each of said first through sixth magnetic layers has a transition metal component and a rare earth metal component and a transition metal component to rare earth metal component ratio TM/RE,
   said first magnetic layer is made of a magnetic material with which a Kerr rotation angle greater than a Kerr rotation angle obtainable from said second magnetic layer can be obtained, said first magnetic layer TM/RE being in a range of 1.25 to 1.7,
   said second magnetic layer is made of a magnetic material having magnetic anisotropy greater than that of said first magnetic layer, said second magnetic layer TM/RE being in the range of 1.0 to 1.4,
   said third magnetic layer is made of rare earth-transition metal amorphous alloy which has magnetic anisotropy smaller than that of said second magnetic layer and that of said fourth magnetic layer and in which sublattice magnetization of the transition metal element is larger than that of the rare earth element, said third magnetic layer TM/RE being in a range of 1.4 to 2.0,
   said fourth magnetic layer is made of rare earth-transition metal amorphous alloy which has a Curie temperature higher than that of said second magnetic layer and that of said third magnetic layer and in which sublattice magnetization of the transition metal element is larger than that of the rare earth element, said fourth magnetic layer TM/RE being in a range of 1.2 to 1.4,
   said fifth magnetic layer is made of a magnetic material having a Curie temperature lower than that of said fourth magnetic layer, said fifth magnetic layer TM/RE being in a range of 1.4 to 2.0, and
   said sixth magnetic layer is made of a magnetic material having a Curie temperature higher than those of said first to fifth magnetic layers, said sixth magnetic layer TM/RE being in a range of 1.2 to 1.5.

2. A magneto-optical recording medium according to claim 1, wherein said first magnetic layer is made of rare earth-transition metal amorphous alloy.

3. A magneto-optical recording medium according to claim 1, wherein said first magnetic layer is made of GdFeCo.

4. A magneto-optical recording medium according to claim 3, wherein the ratio of Co in the transition metal element contained in said first magnetic layer is 10 atom % to 25 atom %.

5. A magneto-optical recording medium according to claim 1, wherein the thickness of said first magnetic layer is 10 nm or greater.

6. A magneto-optical recording medium according to claim 1, wherein said second magnetic layer is made of rare earth-transition metal amorphous alloy in which the sublattice magnetization of the rare earth element is larger than that of the transition metal element.

7. A magneto-optical recording medium according to claim 6, wherein said second magnetic layer is made of rare earth-transition metal amorphous alloy.

8. A magneto-optical recording medium according to claim 1, wherein said second magnetic layer is made of TbFeCo.

9. A magneto-optical recording medium according to claim 8, wherein the ratio of Co in the transition metal element contained in said second magnetic layer is 4 atom % to 9 atom %.

10. A magneto-optical recording medium according to claim 1, wherein the thickness of said second magnetic layer is 10 nm or greater.

11. A magneto-optical recording medium according to claim 1, wherein said third magnetic layer is made of GdFe or GdFeCo.

12. A magneto-optical recording medium according to claim 11, wherein the ratio of Co in the transition metal element contained in said third magnetic layer is 5 atom % or lower.

13. A magneto-optical recording medium according to claim 1, wherein the thickness of said third magnetic layer is 10 nm or greater.

14. A magneto-optical recording medium according to claim 1, wherein said fourth magnetic layer is made of Gd, Tb, Fe and Co.

15. A magneto-optical recording medium according to claim 14, wherein the ratio of Co in the transition metal element contained in said fourth magnetic layer is 10 atom % to 18 atom %.

16. A magneto-optical recording medium according to claim 14, wherein said fourth magnetic layer is formed in such a manner that ratio Gd/Tb of the quantity of Gd formed into a film and the quantity of Tb formed into a film is in a range from 1/1 to 1/5.

17. A magneto-optical recording medium according to claim 1, wherein the thickness of said fourth magnetic layer is 10 nm to 30 nm.

18. A magneto-optical recording medium according to claim 1, wherein said fifth magnetic layer is made of rare earth-transition metal amorphous alloy.

19. A magneto-optical recording medium according to claim 1, wherein said fifth magnetic layer is made of TbFe or TbFeCo.

20. A magneto-optical recording medium according to claim 19, wherein the ratio of Co in the transition metal element contained in said fifth magnetic layer is 10 atom % or lower.

21. A magneto-optical recording medium according to claim 1, wherein the thickness of said fifth magnetic layer is 10 nm to 20 nm.

22. A magneto-optical recording medium according to claim 1, wherein said sixth magnetic layer is made of rare earth-transition metal amorphous alloy.

23. A magneto-optical recording medium according to claim 1, wherein said sixth magnetic layer is made of TbFeCo.

24. A magneto-optical recording medium according to claim 23, wherein the ratio of Co in the transition metal element contained in said sixth magnetic layer is 70 atom % to 90 atom %.

25. A magneto-optical recording medium according to claim 1, wherein the thickness of said sixth magnetic layer is 30 nm to 50 nm.

26. A magneto-optical recording medium according to claim 1, further comprising:
    a first dielectric layer formed below said first magnetic layer; and
    a second dielectric layer formed on said sixth magnetic layer.

27. A magneto-optical recording medium according to claim 26, wherein said first and second dielectric layers are formed by sputtering, and
    said first dielectric layer is formed at a pressure of sputtering gas higher than that for use when said second dielectric layer is formed.

28. A magneto-optical recording medium according to claim 26, wherein the thickness of said first dielectric layer is 55 nm to 75 nm.

29. A magneto-optical recording medium according to claim 26, wherein a heat conducting layer having a heat conductivity higher than that of said second dielectric layer is formed on said second dielectric layer.

30. A magneto-optical recording medium according to claim 29, wherein said heat conducting layer is made of AlTi.

31. A magneto-optical recording medium according to claim 30, wherein the ratio of Ti in said heat conducting layer is 0.1 wt % to 10 wt %.

32. A magneto-optical recording medium according to claim 29, wherein the thickness of said heat conducting layer is 10 nm to 60 nm.

* * * * *